United States Patent [19]
Otsubo et al.

[11] Patent Number: 6,041,033
[45] Date of Patent: Mar. 21, 2000

[54] DISK HOLDING DEVICE

[75] Inventors: Kensei Otsubo, Kasuga; Hideo Yamaguchi, Fukuoka, both of Japan

[73] Assignee: Matsushita Electric Industrial Co., Ltd., Osaka, Japan

[21] Appl. No.: 08/991,539

[22] Filed: Dec. 16, 1997

[30] Foreign Application Priority Data

Dec. 18, 1996 [JP] Japan .................................. 8-337895
Jul. 4, 1997 [JP] Japan .................................. 9-179373

[51] Int. Cl.$^7$ .................................................. G11B 17/028
[52] U.S. Cl. ............................................ 369/271; 369/270
[58] Field of Search .................................... 369/264–271

[56] References Cited

U.S. PATENT DOCUMENTS

| | | | |
|---|---|---|---|
| 4,077,236 | 3/1978 | Dalziel | 64/22 |
| 4,649,532 | 3/1987 | Aldenhoven | 369/270 |
| 4,730,300 | 3/1988 | Kamoshita et al. | 369/270 |
| 4,958,839 | 9/1990 | Guzik et al. | 279/2 R |
| 5,117,414 | 5/1992 | Caldwell | 369/266 |
| 5,379,287 | 1/1995 | Heinrich | 369/270 |
| 5,555,233 | 9/1996 | Yano et al. | 369/270 |
| 5,637,200 | 6/1997 | Tsymberov | 204/298.15 |
| 5,644,564 | 7/1997 | Peters | 369/270 |
| 5,774,445 | 6/1998 | Sawi et al. | 369/270 |
| 5,862,120 | 1/1999 | Mukawa | 369/270 |

FOREIGN PATENT DOCUMENTS

| | | |
|---|---|---|
| 0428382 | 5/1991 | European Pat. Off. . |
| 2078456 | 11/1971 | France . |
| 38 12 963 | 11/1989 | Germany . |
| 4212213 | 10/1993 | Germany . |
| 58-194171 | 11/1983 | Japan . |
| 6360459 | 1/1984 | Japan . |
| 4-278253 | 10/1992 | Japan . |
| 5-151675 | 6/1993 | Japan . |
| 5-298798 | 11/1993 | Japan . |
| 7-057358 | 3/1995 | Japan . |
| 7-153157 | 6/1995 | Japan . |
| 7-287910 | 10/1995 | Japan . |
| 8-190752 | 7/1996 | Japan . |
| 8-335351 | 12/1996 | Japan . |

OTHER PUBLICATIONS

Patent Abstracts of Japan—vol. 012, No. 074 (P–674), Mar. 9, 1988 and JP 62.212958 A (Kobe Steel Ltd), Sep. 18, 1987, * abstract *.

Patent Abstracts of Japan—vol. 010, No. 015 (P–422), Jan. 21, 1986 and JP 60 170060 A (Matsushita Denki Sangyo KK), Sep. 3, 1985, * abstract *.

*Primary Examiner*—William J. Klimowicz
*Attorney, Agent, or Firm*—Stevens, Davis, Miller & Mosher, L.L.P.

[57] ABSTRACT

A disk holding device of a thin design is provided which can positively hold disks of different thicknesses, and also can automatically align the disk. The disk holding device includes a plurality of claw-like members, a center hub receiving the claw-like members therein, resilient members which are received in the center hub, and respectively urge the claw-like members in a radial direction of a disk, a turntable for supporting the disk thereon, a cone ring which is provided at a lower side of the center hub, and is movable along an axis of a spindle shaft and an urging member urging the cone ring in a disk-unloading direction away from an upper surface of the turntable. The cone ring has a slanting portion for engagement with a center hole portion of the disk, and each claw-like member is received in the center hub in such a manner that the claw-like member is slidable in the radial direction of the disk, and is angularly movable in the disk-unloading direction. With this construction, a force, required for loading and unloading the disk, is small, and therefore the deformation and strain of the disk can be kept to a minimum. And, the disk holding mechanism and the disk alignment mechanism can be combined into an integral construction, thereby achieving a thin design of the disk holding device.

41 Claims, 28 Drawing Sheets

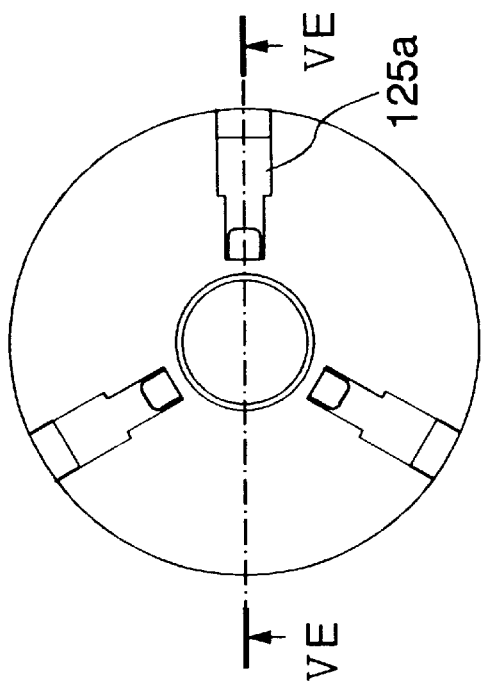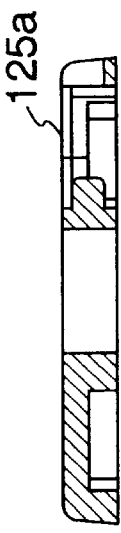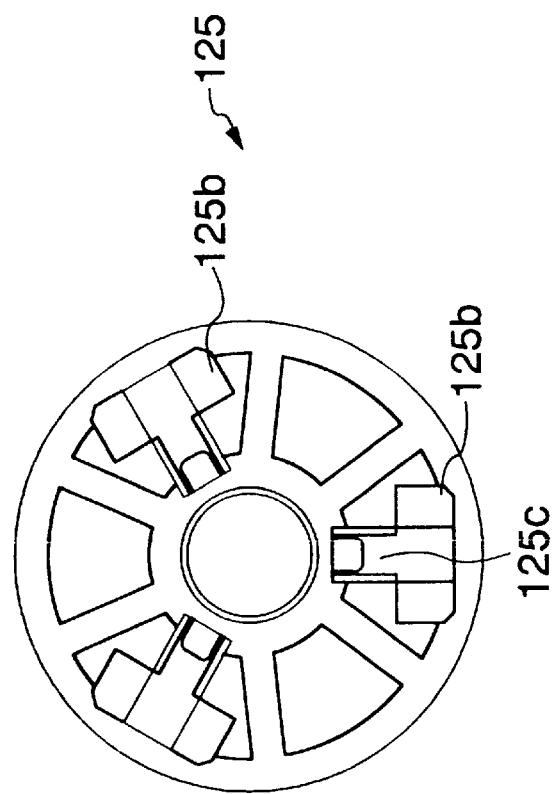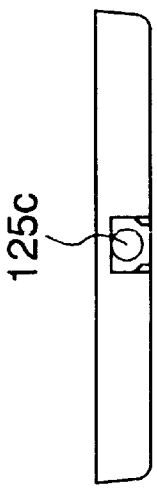

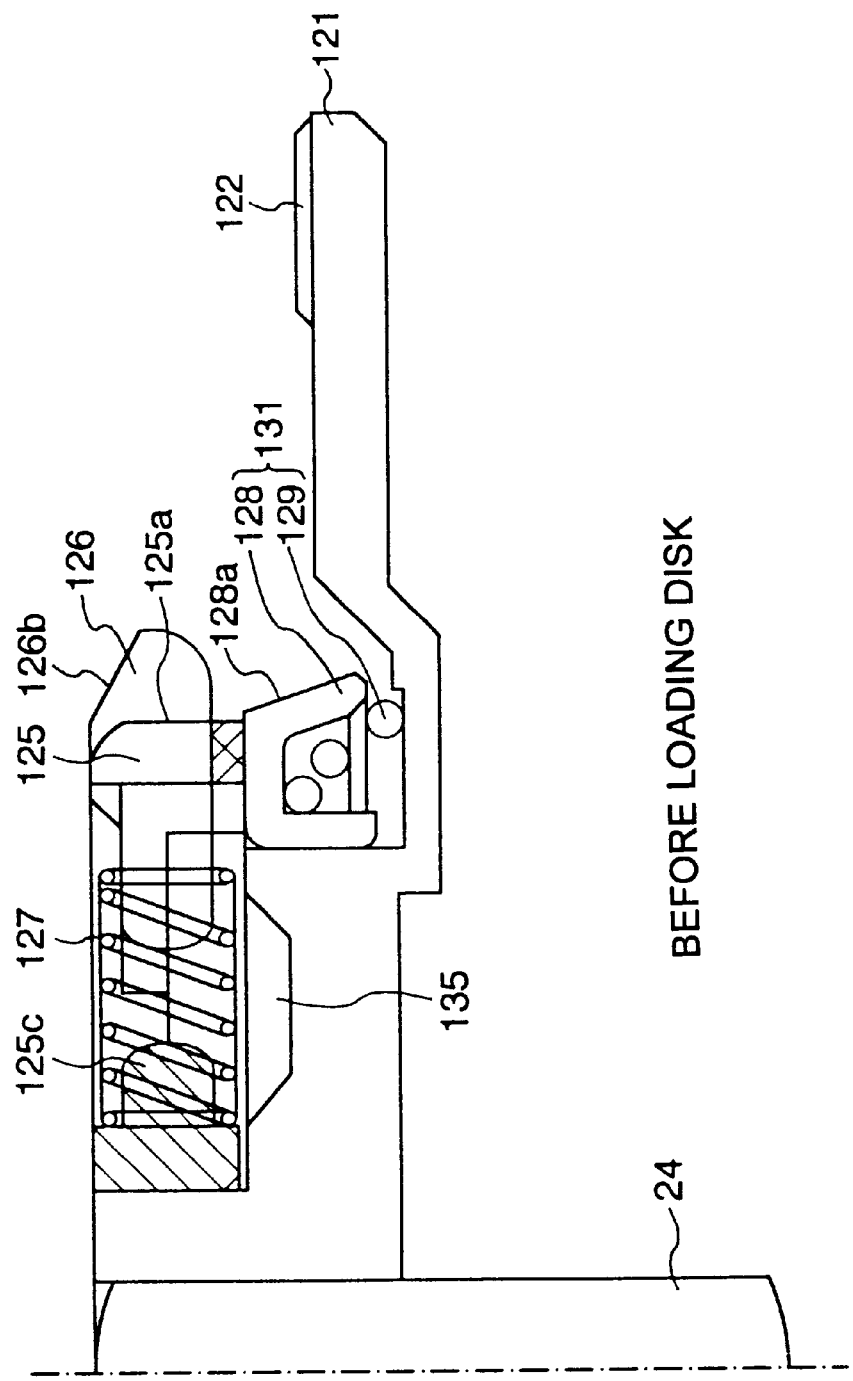

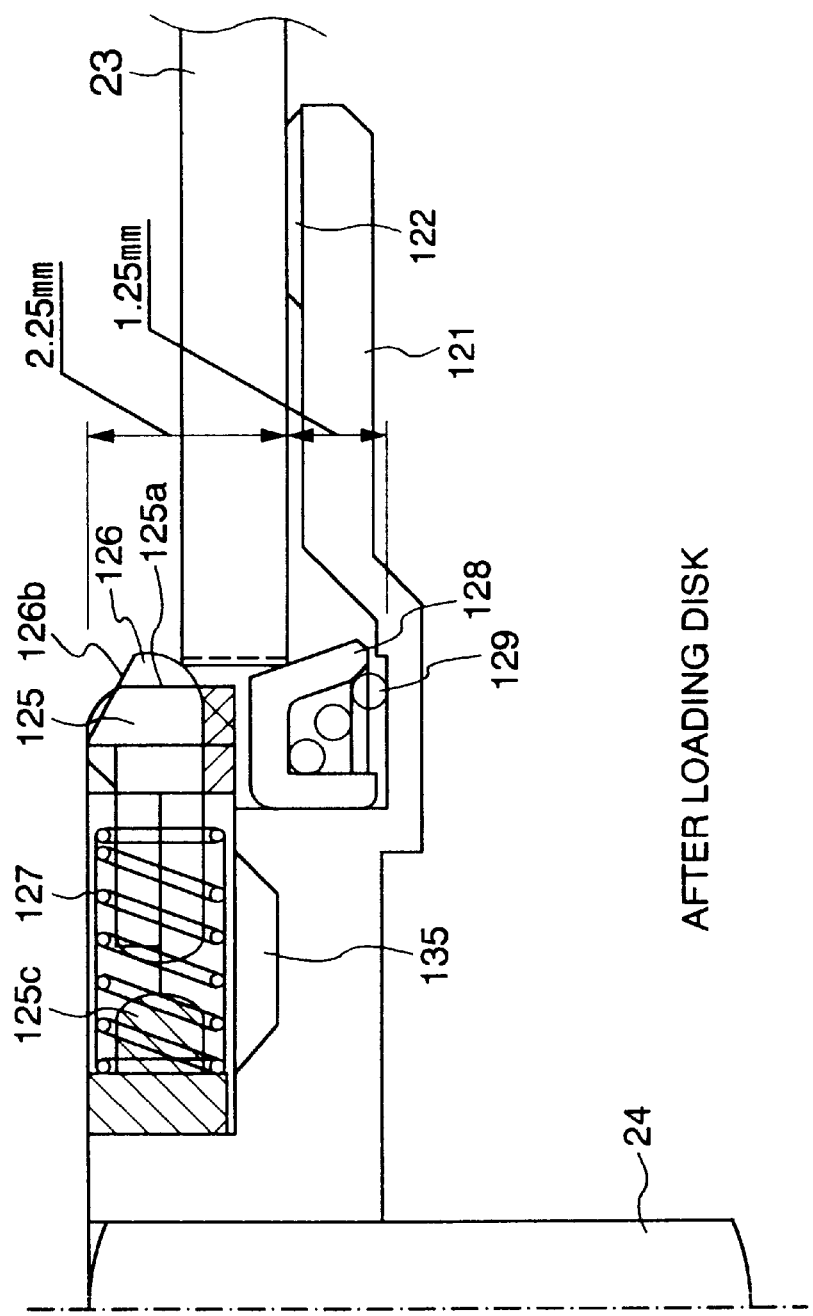

(MOUNTING)

(REMOVING)

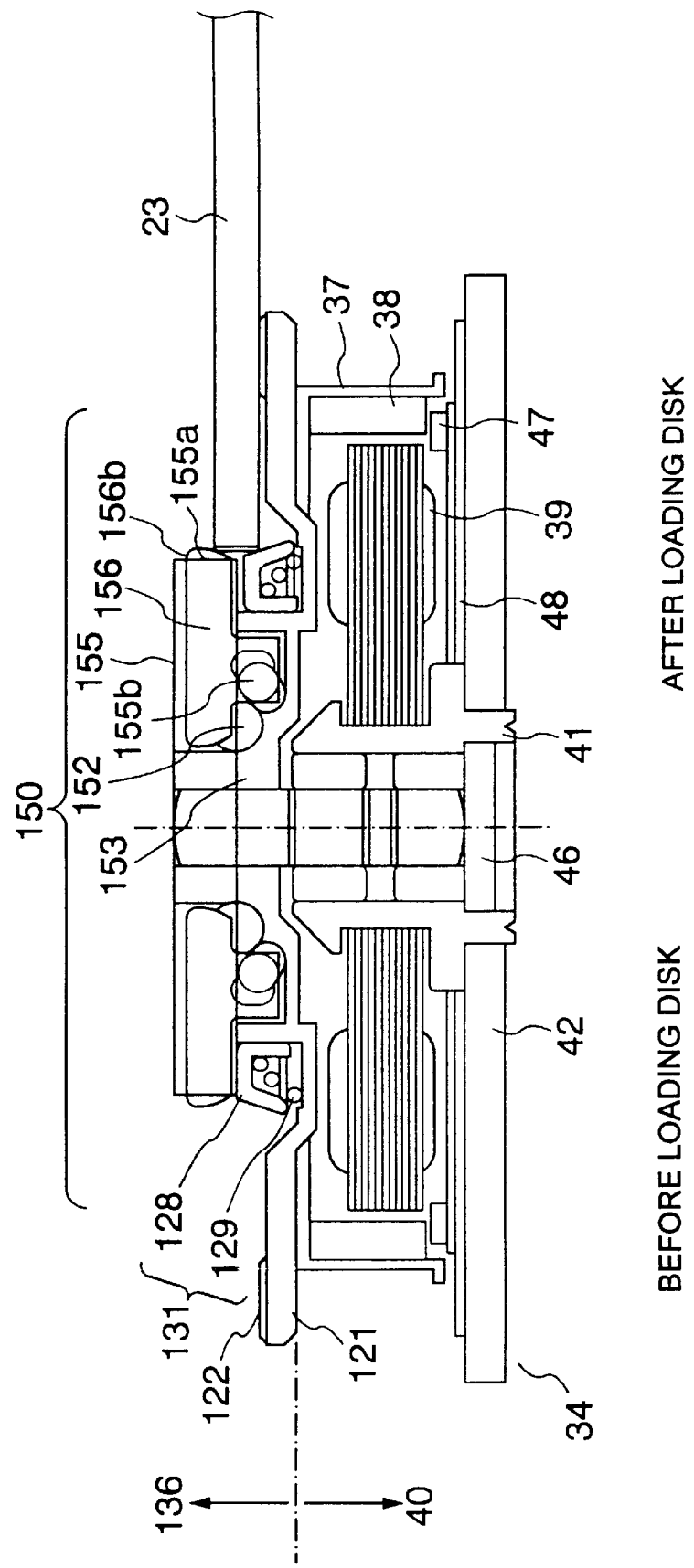

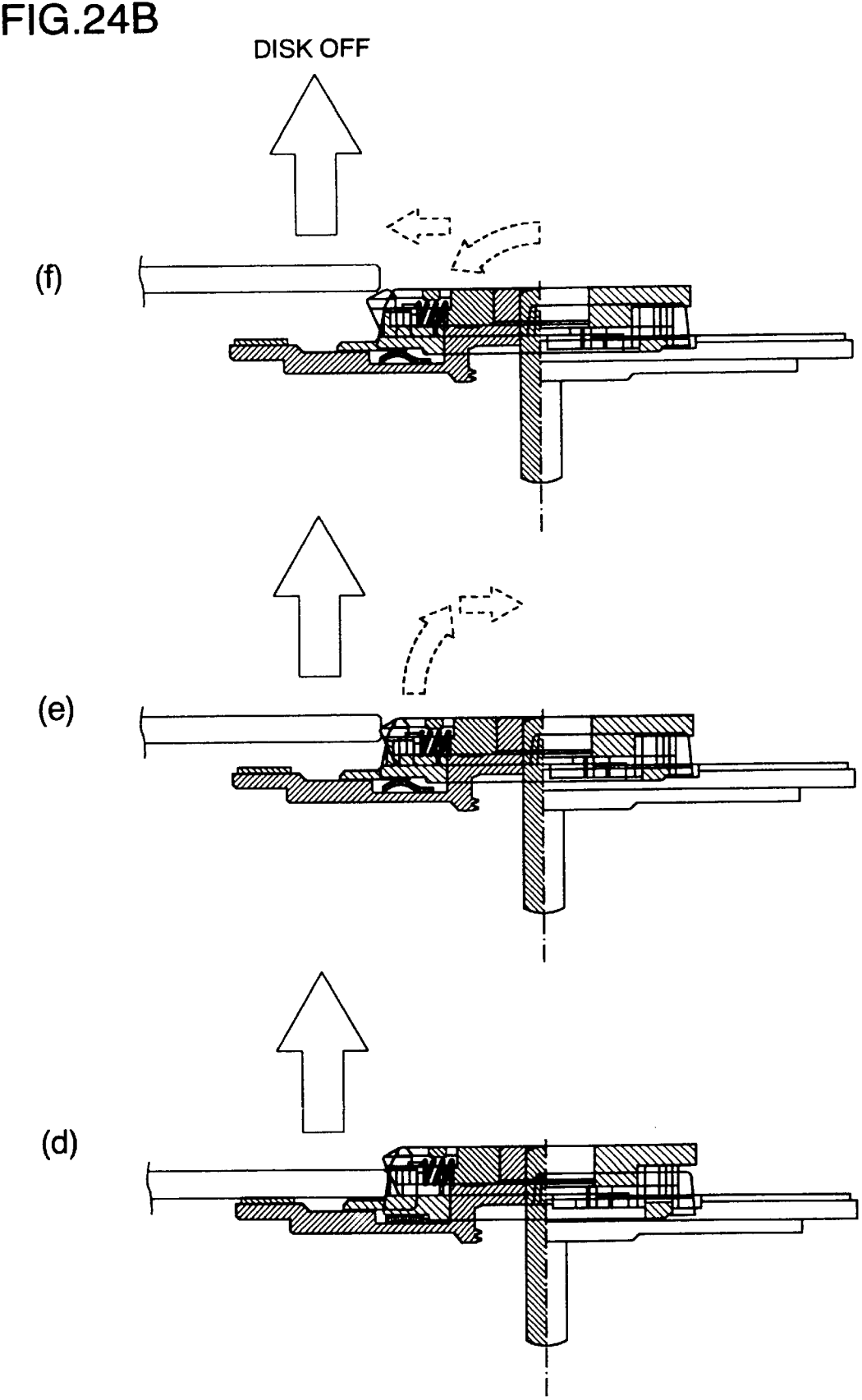

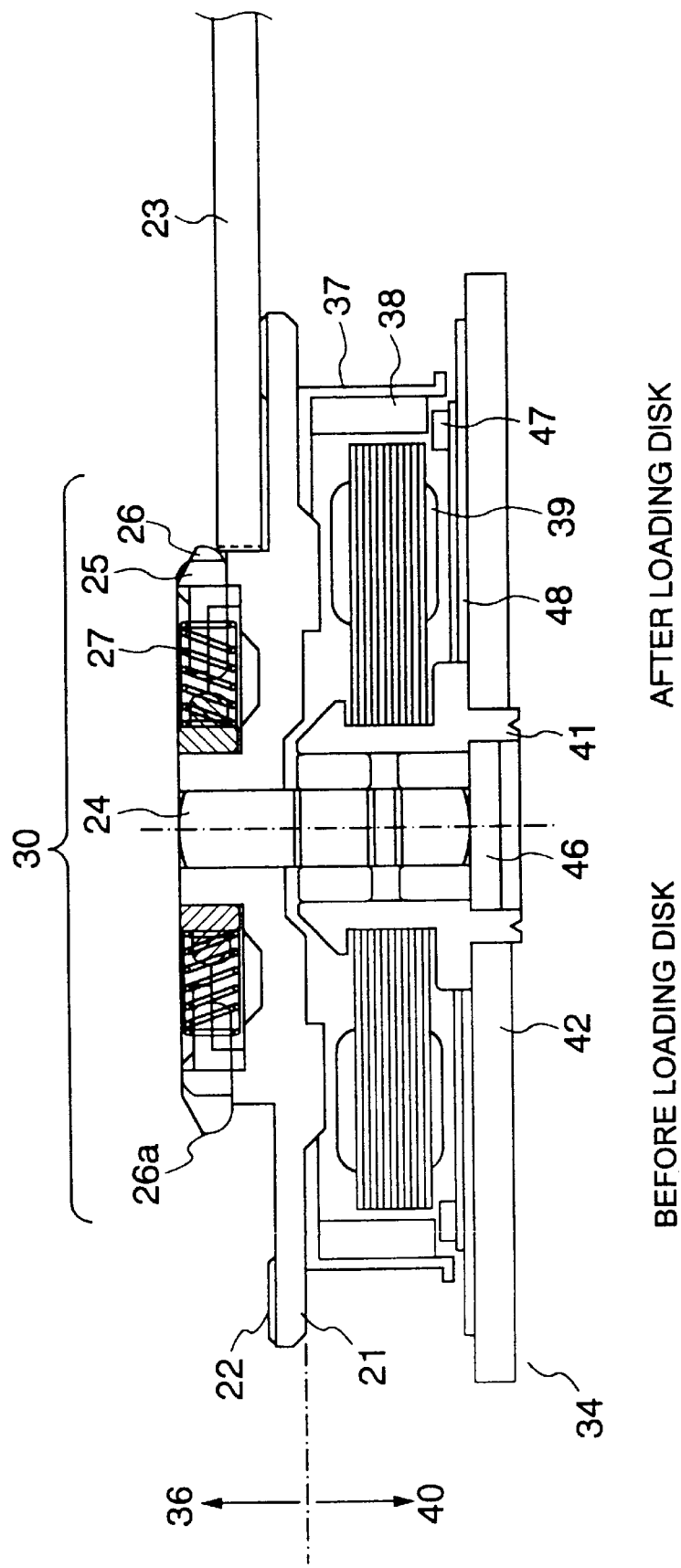

(MOUNTING)

(SLIDE DIRECTION)

(SLIDE DIRECTION)

(REMOVING)

(REMOVING DIRECTION)

DISK CENTER ALIGNMENT MECHANISM

DISK HOLDING DEVICE

BACKGROUND OF THE INVENTION

1. Field of the Invention

This invention relates to a disk holding device for holding a disk medium so as to rotate the same, the disk holding device being used in an optical disk drive unit which records and reproduces information relative to the disk medium by light or light-magnetism.

2. Description of the Related Art

Recently, remarkable progress has been made in techniques relating to of recording and reproducing information by the use of light. Examples of read-only optical devices include a so-called CD (compact disk), a CD-ROM and a laser disk. Read-write optical devices have now been extensively used in secondary memory devices of computers, rewritable filing devices and so on. Large-capacity optical disk are devices, such as DVDs (digital versatile disk), are expected to become a mainstream product in the future.

There exist various optical disk standards having respective features. These have been developed to meet requirements for performance and also because of differences in the time of development of the technologies. However, the existence of the various optical disk standards and the sacrifice of their interchangeability are disadvantageous in the handling of these optical disks and the extension of the market. Particularly, CDs and DVDs, which both have created a large market in homes and so on, and have almost the same appearance in the form of a disk having a diameter of 12 cm, are not optically interchangeable with each other. As a result, the DVD disk can not be reproduced by a CD player, and the opposite is the same. This is due to differences in (1) thickness of a disk plate (CD is 1.2 mm thick, and DVD consists of two 0.6 mm-thick plates laminated together), (2) characteristics of objective lenses, (3) wavelength of laser beams to be used, and recording density (the DVD is higher in density than the CD).

In the market, there has been an increasing requirement that the two different disks, that is, the CD and the DVD, which have different standards, respectively, should be used in a common disk drive. A conventional disk holding device, which has been provided to meet this requirement, and is capable of holding such two different optical disks, will now be described with reference to the drawings. Generally, conventional disk holding devices are classified into a clamp type (disclosed for example in Japanese Patent No. 1509217) Japanese Patent Application No. 63-60459), in which a disk is clamped and held between two mechanism portions, and a self-holding type in which, when a disk is placed on a table, its holding mechanism holds the disk. In order to achieve a small-size and thin design of the disk drive unit, the self-holding type is advantageous. The disk holding device of the self-holding type will be described below.

FIG. 25 is a view showing the construction of the conventional disk holding device of the self-holding type. In FIG. 25, a disk holding mechanism portion 30 capable of self-holding a disk 23 will be described. In FIG. 25, a spindle motor 34 is broadly divided into a turntable unit 36 for holding the disk 23 and a drive portion 40 for rotating the disk 23.

Reference is first made to the turntable unit 36. When holding the disk 23, claw-like members 26 first interfere with an inner peripheral edge of the disk 23. The claw-like members 26 are provided at at least three portions of a turntable 21. Each of the claw-like members 26 is urged radially outwardly (that is, toward the outer periphery) by a resilient member 27, and bosses (not shown), provided respectively on opposite sides of the claw-like member 26, are supported respectively by guides (not shown) of a center hub 25.

On the other hand, the drive portion 40 mainly constitutes a magnetic circuit, and consists of a rotor yoke 37, magnets 38, a coil 39, a back yoke 42, and a bearing metal unit 41 supporting a spindle shaft 24 press-fitted into the turntable 21. The spindle shaft 24 is rotatably supported on a thrust bearing 46. Hall elements 47 are mounted on an FPC 48 provided on the surface of the back yoke 42, and are opposed to the magnets 38, respectively. In this embodiment, although the spindle motor is of the peripherally-opposed type, it may be of the surface-opposed type in which case the same functions are achieved.

FIGS. 26A and 26B are illustrations of the operation of the disk holding mechanism portion 30 of FIG. 25. In FIGS. 26A and 26B, for loading the disk 23, the disk 23 is pressed respectively against rounded portions 26b of the claw-like members 26 (provided at at least three portions of the turntable 21) from the upper side, and is placed on the turntable 21. At this time, each claw-like member 26 is retracted by the disk 23 against the bias of the resilient member 27 to slide toward the inner periphery of the center hub 25 along the guides in the center hub 25.

Thus, the inner peripheral edge of the disk 23 moves past the claw-like members 26 while pressing the rounded portions 26b of these claw-like members 26. The disk 23 is pushed until it is brought into intimate contact with a slip sheet 22 bonded to the turntable 21.

When the inner peripheral edge of the disk 23 thus moves past the claw-like members 26, the claw-like members 26 are extended or projected under the influence of the resilient members 27, so that a lower slanting surface of the rounded portion 26 of each claw-like member 26 abuts against the inner peripheral edge of the disk 23. As a result, the disk 23 is self-held by the claw-like members 26 provided respectively at at least three portions of the turntable 21. At this time, even if the disk 23 is eccentric with respect to the spindle shaft 24, the disk 23 is held by the urging force of the claw-like members 26 held against the disk 23, and is rotated by the drive portion 40.

Next, a disk holding device of the clamp type will be described, and a countermeasure to the above-noted eccentricity will also be described. FIG. 27 is a view showing the construction of the disk holding device of the clamp type. A turntable unit 36 for clamping a disk 23 will be described with reference to FIG. 27. In FIG. 27, a center boss 45 is provided at the center of a magnet clamper 44 having a magnet (not shown) embedded therein. The center boss 45 is engaged with a spindle shaft 24. When the magnet clamper 44 is closed, the magnet in the magnet clamper 44 produces a magnetic attraction force relative to a ferromagnetic member (e.g. iron plate) embedded in a cone ring 28. The precision of the center position of the disk is maintained by the center boss 45 of the magnet clamper 44. The disk 23 is pressed against a turntable 21 uniformly over an entire surface thereof.

A disk alignment mechanism portion for aligning the disk 23 so as to overcome the above eccentricity problem will be described with reference to FIG. 27. The turntable unit 36, having the disk alignment mechanism portion 31 mounted therein, is mounted on the spindle shaft 24. More specifically, the spindle shaft 24 is press-fitted in the turntable 21. The cone ring 28 is slidably mounted on the turntable 21, and is urged in a disk-unloading direction by a return coil spring 29. The sliding movement of the cone ring 28 is limited by a C-ring 43. That surface of the cone ring 28 for engagement with the inner peripheral edge of the disk 23 is formed into a substantially conical surface which is tapered, that is, decreasing in diameter progressively in the disk-unloading direction.

First, the disk 23 is placed on the disk alignment mechanism portion 31 of the above construction, and when the magnet clamper 44 is closed, the surface of the disk 23 is pressed against the turntable 21 as described above, and during this operation, the inner peripheral edge of the disk 23 slides along the conical surface of the cone ring 28. As a result, the disk 23 can be aligned while being accurately held in position.

In order that the above conventional disk holding devices can hold a CD and a DVD different in plate thickness from each other, and also can have a small-size and thin design, it is necessary that the disk holding device can self-hold the disk while aligning the disk. However, the reduction of the thickness of the turntable (base member) adversely affects the rigidity and the rotation accuracy particularly when the turntable is made of a resin material. Moreover, when the mechanism portion capable of self-holding and aligning the disk is mounted on the turntable, it has been difficult to reduce the thickness of the disk holding device in a direction of the thickness of the disk.

Under these circumstances, the disk holding device has now been required to be capable of holding a CD and a DVD and also to have such a small-size and thin design as to be mounted in a mobile computer.

SUMMARY OF THE INVENTION

The present invention solves the above problems. It is an object of this invention to provide a disk holding device which can easily load and unload disks (e.g. a CD and a DVD) of different thicknesses and inner diameters, and can stably rotate the disk in a positively-loaded condition, and can be formed into a small-size and thin design with a simple mechanism.

To solve the problems according to the present invention, there is provided a disk holding device which comprises a plurality of claw-like members, a center hub receiving the claw-like members therein, resilient members which are received in the center hub, and respectively urge the claw-like members in a radial direction of a disk, a turntable for supporting the disk thereon, a cone ring which is provided at a lower side of the center hub, and is movable along an axis of a spindle shaft, and an urging member urging the cone ring in a disk-unloading direction away from an upper surface of the turntable. The cone ring has a slanting portion for engagement with a center hole portion of the disk, and each claw-like member is received in the center hub in such a manner that the claw-like member is slidable in the radial direction of the disk, and is angularly movable in the disk-unloading direction.

With this construction, the disk holding device can positively self-hold the selected disk with a proper holding force, and also can automatically align the disk even if the disks to be loaded have different thicknesses and different inner peripheral edge configurations. A force, required for loading and unloading the disk, is small, and therefore the deformation and strain of the disk can be kept to a minimum. Further, the disk holding mechanism and the disk alignment mechanism can be combined into an integral construction, thereby achieving a thin design of the disk holding device.

BRIEF DESCRIPTION OF THE DRAWINGS

FIG. 5A is an enlarged plan view of a center hub;

FIG. 5B is an enlarged side-elevational view of the center hub;

FIG. 5C is an enlarged bottom view of the center hub;

FIG. 5D is a cross-sectional view taken along the line VE—VE of FIG. 5C;

FIG. 6 is an enlarged cross-sectional view of the disk holding device of FIG. 1 before a disk is loaded;

FIG. 7 is an enlarged cross-sectional view of the disk holding device of FIG. 1 after the disk is loaded;

FIG. 9 is a cross-sectional view of a disk holding device using modified urging means;

FIG. 24B is a view showing the disk unloading operation;

FIG. 25 is a view showing the construction of a conventional disk holding device of the self-holding type;

DESCRIPTION OF THE PREFERRED EMBODIMENTS (First Embodiment)

Figure 1:
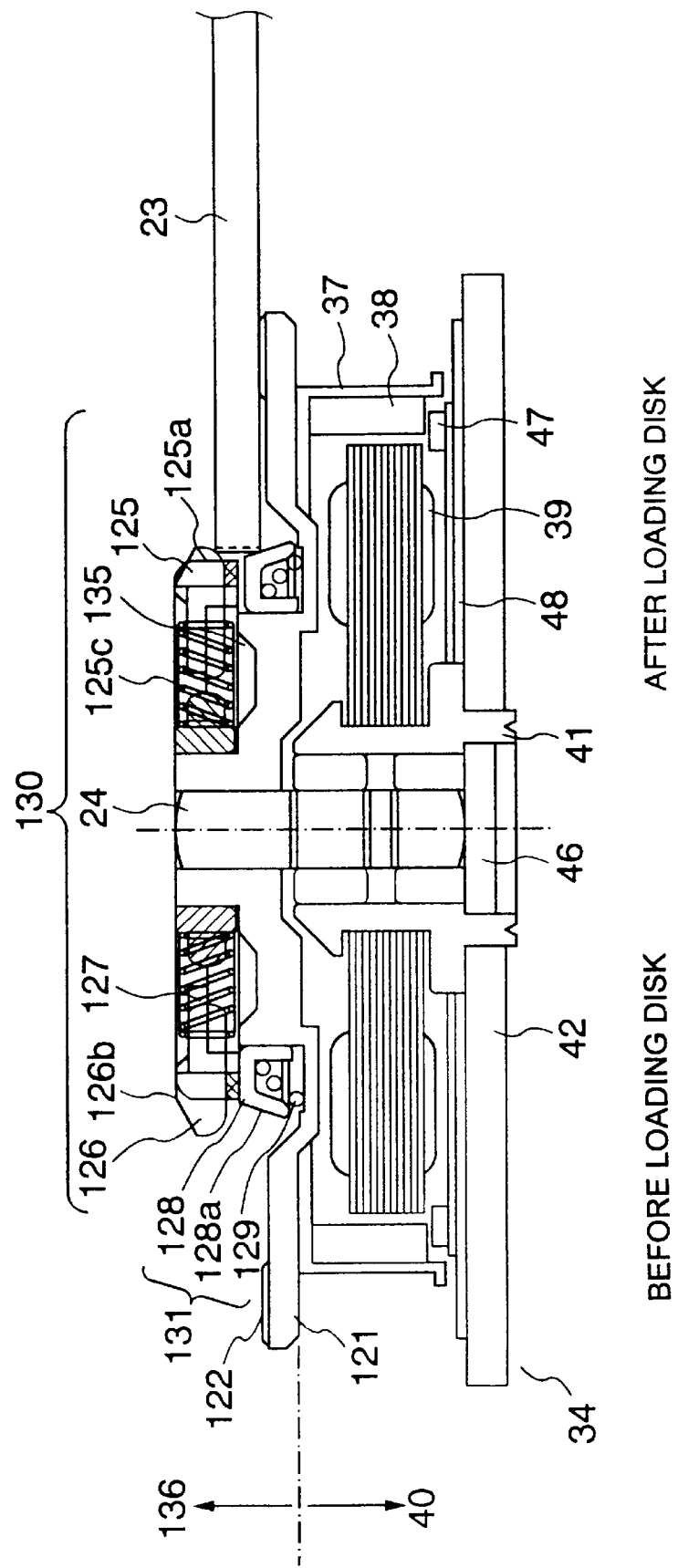
FIG. 1 is a cross-sectional view of a disk holding device according to the first embodiment of the present invention.
Figure 2:
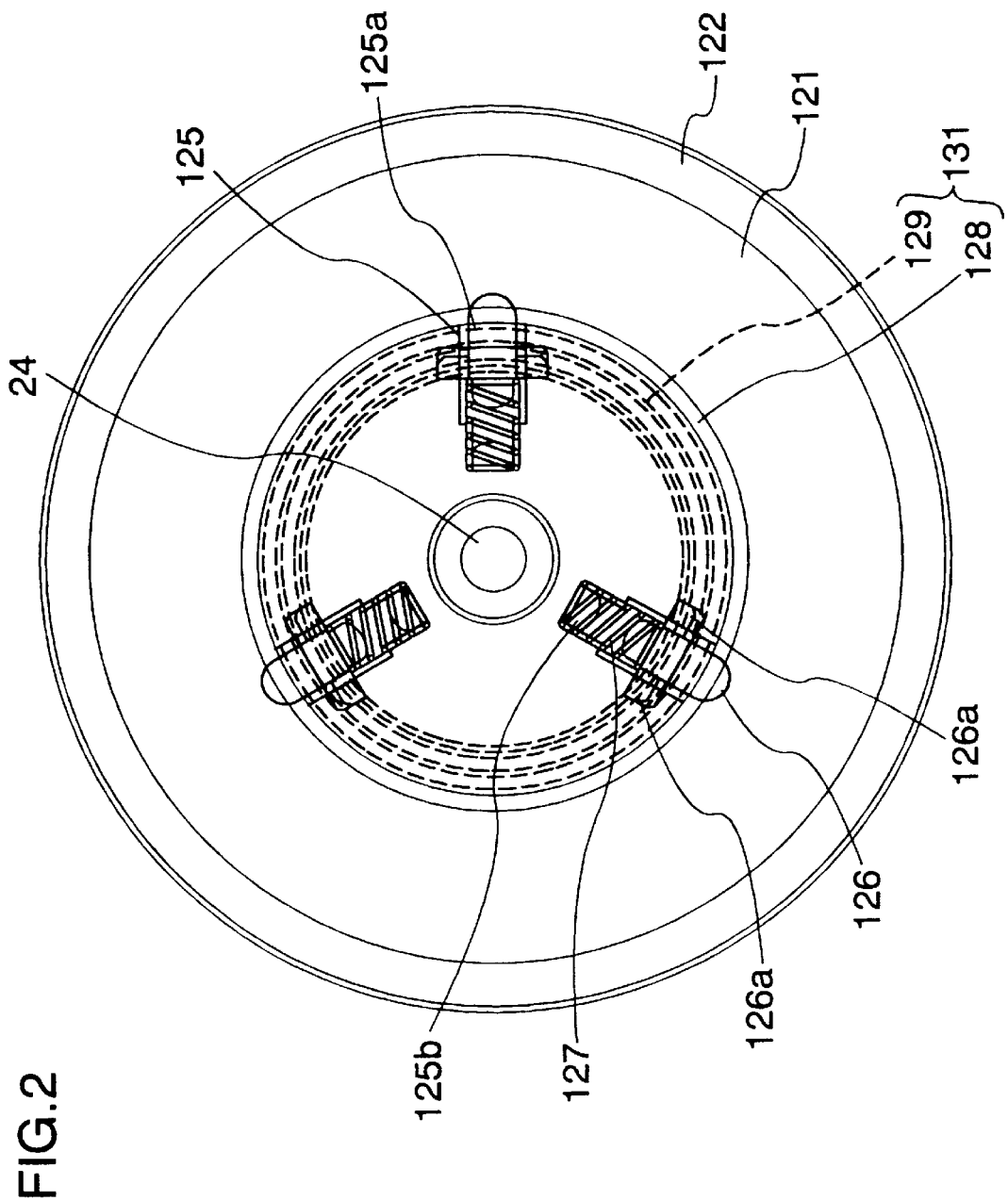
FIG. 2 is a plan view of the disk holding device of FIG. 1.

FIG. 1 is a cross-sectional view of a first embodiment of a disk holding device of the present invention. In the sheet of FIG. 1, a left side on a central spindle shaft 24 shows a condition before a disk is loaded whereas a right side on spindle shaft 24 shows a condition after the disk is loaded. FIG. 2 is a plan view of the disk holding device of FIG. 1. In FIGS. 1 and 2, a disk alignment mechanism portion 131 for aligning the disk 23, and a disk holding mechanism portion 130 for self-holding the disk 23 are mounted on a turntable unit 136. A drive portion 40 comprises the same mechanism as described above for the conventional drive portion 40. The three kinds of mechanisms are combined together to form an integral construction. The drive portion 40 identical to the conventional drive portion will not be described in detail.

Figure 3A:
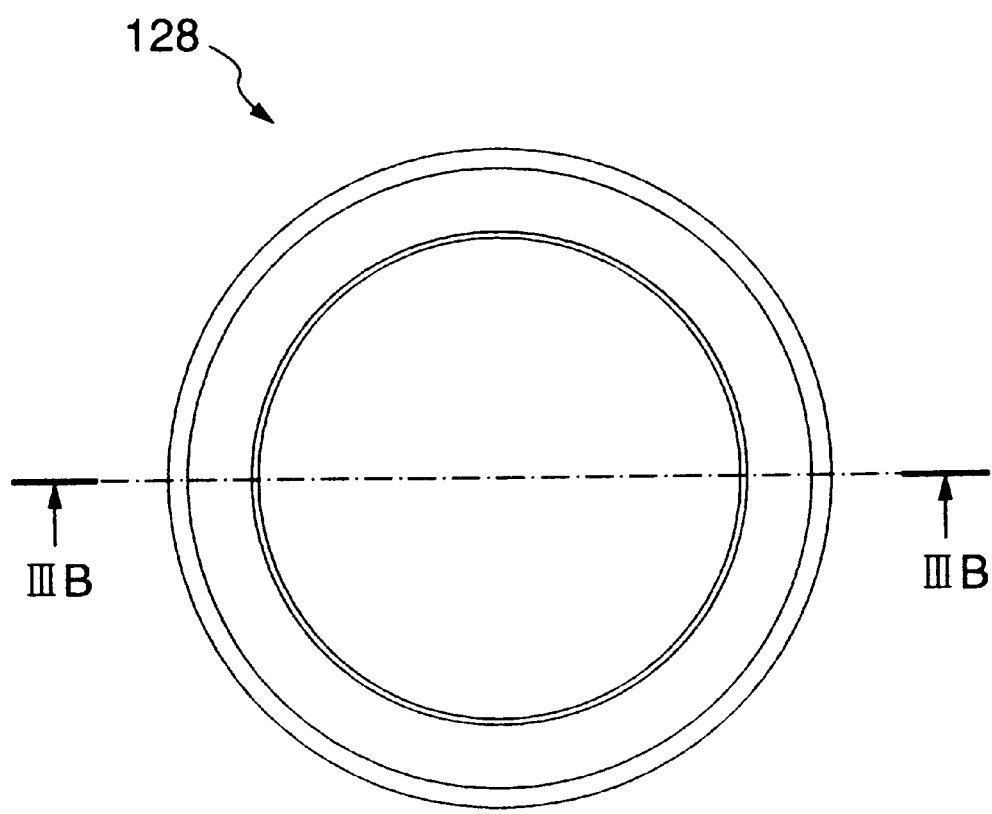
FIG. 3A is an enlarged plan view of a cone ring.
Figure 3B:
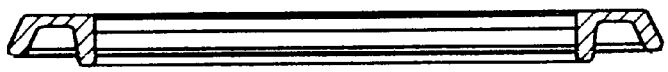
FIG. 3B is a cross-sectional view taken along the line IIIB and IIIB of FIG. 3A.
Figure 4A:
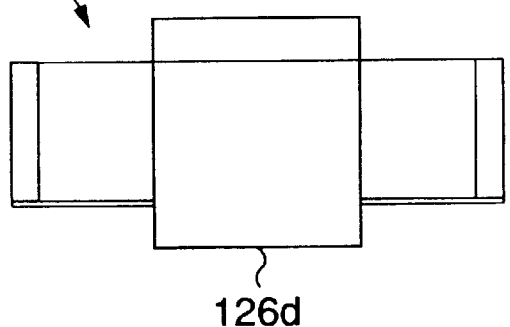
FIGS. 4A, 4B, 4C and 4D are respectively a top view, a front-elevational view, a side-elevational view and a bottom view of a claw-like member on an enlarged scale.
Figure 4B:
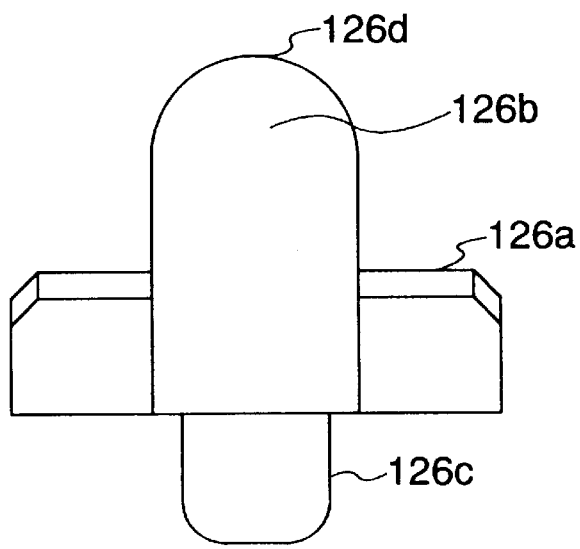
Figure 4C:
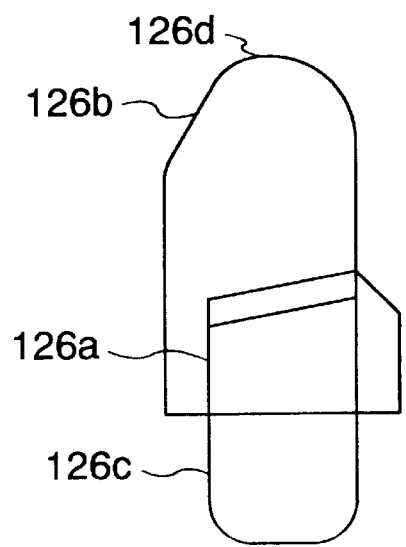
Figure 4D:
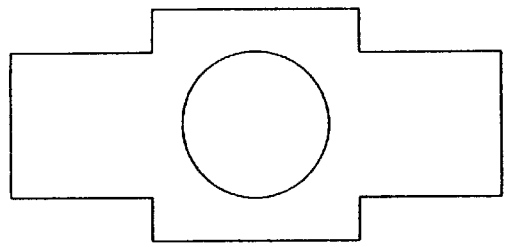

The disk alignment mechanism portion 131 comprises a cone ring 128 and a return coil spring 129. FIGS. 3A and 3B show the cone ring 128 on an enlarged scale. As shown in FIGS. 1 to 3B, the cone ring 128 is disposed at a lower side of the disk holding mechanism portion 130. The cone ring 128 is slidably mounted on a turntable 121. A slip sheet 122 for imparting an appropriate sliding friction torque to the disk 23 is bonded to a predetermined outer peripheral portion of the turntable 121, an inner periphery of this predetermined outer peripheral portion being radially spaced 12 mm from the center of the turntable 121 while its outer periphery is radially spaced 14 mm from the center.

The cone ring 128 is urged in a disk-unloading direction by the return coil spring 129. The return coil spring 129 acts between a recessed portion (which defines a lower limit of the sliding movement of the cone ring 128) of the turntable 121 and a recessed portion in a reverse side of the cone ring 128. The return coil spring 129 is wound into a conical shape (see FIG. 1). The upward sliding movement of the cone ring 128 is limited by a center hub 125. With this construction, it is not necessary to provide the sliding movement limitation member, such as a C-ring, heretofore required, and therefore the disk alignment mechanism portion 131 of the present invention has a simple construction, and its manufacturing process is simplified, and the cost can be reduced.

That surface of the cone ring 128 for engagement with the inner peripheral edge of the disk 23 is formed into a tapering (slanting) surface or portion 128a of a substantially conical shape decreasing in diameter progressively in the disk-unloading direction. Therefore, the position of the center of the disk is regulated by the tapering portion 128a engaged with the inner peripheral edge of the disk 23. With this construction, even if there are variations in the inner diameter of the disk 23, this inner diameter variation can be absorbed by the tapering portion 128a. The inner peripheral edge of the disk 23 engages the tapering portion 128a, and also engages claw-like members 126 (described later). With this arrangement, the disk 23 is aligned, and also is held on the turntable 121.

As shown in FIGS. 1 and 2, in the disk holding mechanism portion 130, the claw-like members 126 are arranged, for example, at three regions of the outer peripheral portion of the center hub 125, respectively, and are circumferentially spaced 120 degrees from one another. FIGS. 4A to 4D show the claw-like member 126 on an enlarged scale, and FIGS. 5A to 5D show the center hub 125 on an enlarged scale.

In FIGS. 1, 2, 4A to 4D and 5A to 5D, the claw-like member 126 of a generally cross-shape has bosses 126 formed respectively on opposite sides thereof, and an engagement projection 126c formed at its rear end. A distal end portion of the claw-like member 126 has a slanting portion 126b decreasing the thickness progressively toward its distal end (that is, toward the outer periphery of the disk), and a ball end portion 126d of a semi-spherical shape. The claw-like member 126 is made, for example, of a resin.

Center hub windows 125a are formed respectively in three portions of the center hub 125 spaced circumferentially 120 degrees from one another. Guide grooves 125b are formed at a reverse side of the center hub window 125a, and an engagement projection 125c is provided at a radially-inner end of the center hub window 125a. The bosses 126a of each claw-like member 126 are engaged respectively in the guide grooves 125b of the associated center hub window 125a. The claw-like member 126 is supported on the center hub 125, with the bosses 126a engaged respectively in the guide grooves 125b, in such a manner that the claw-like member 126 is slidable in the radial direction of the disk, and also is angularly movable about the radially-outermost portions of the guide grooves 125b in a direction perpendicular to the disk surface.

A resilient member 127 extends between each engagement projection 125c of the center hub 125 and the engagement projection 126c of the associated claw-like member 126, and is received in the center hub 125. The resilient member 127 comprises, for example, a compression spring. Spaces 135 for allowing the bending of the resilient members 127 are formed respectively in those portions of the turntable 121 disposed respectively beneath the three resilient members 127. Therefore, each claw-like member 126 is urged toward the outer periphery of the disk by the resilient member 127, so that the bosses 126a are engaged respectively in the radially-outermost portions of the guide grooves 125b in a stand-by condition.

As shown in FIG. 7, the turntable unit 136 of the above construction can be formed into a total thickness of not more than 3.8 mm (for example, 3.5 mm), and more specifically the dimension of its disk-unloading side portion, measured from the disk-mounting surface (that is, the upper surface of the slip sheet 22), is not more than 2.5 mm (for example, 2.25 mm), and the dimension of its disk-loading side portion (close to the turntable 121), measured from the disk-mounting surface, is not more than 1.3 mm (for example, 1.25 mm).

Figure 8A:
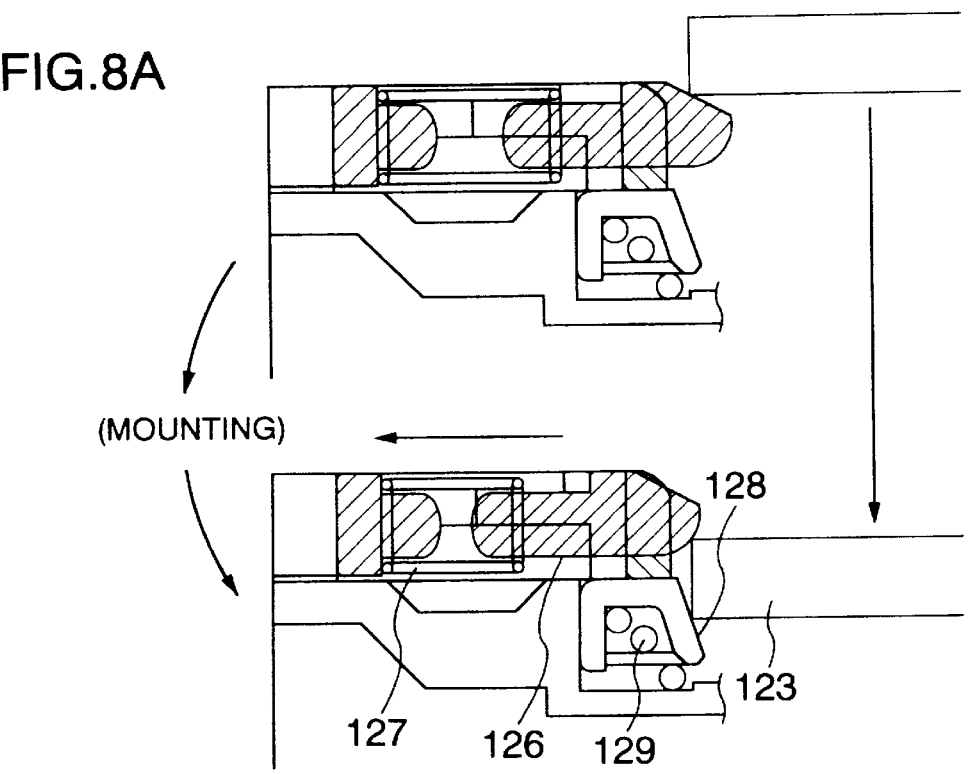
FIG. 8A is a view showing the disk loading operation.
Figure 8B:
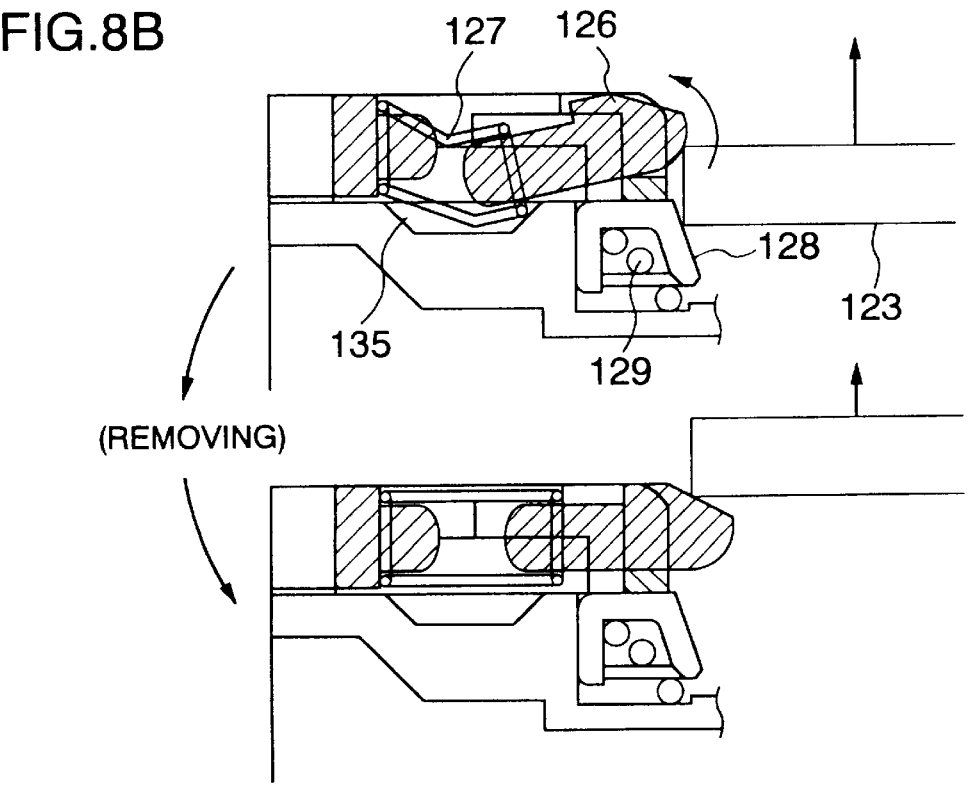
FIG. 8B is a view showing the disk unloading operation.

The disk loading and unloading operations of the turntable unit 136 of the above construction will now be described. FIG. 6 is an enlarged, cross-sectional view of the disk holding device, showing a condition before the disk is loaded, and FIG. 7 is an enlarged, cross-sectional view of the disk holding device, showing a condition after the disk is loaded, and FIGS. 8A and 8B are views explanatory of the disk loading and unloading operations. In FIGS. 1, 6, 8A and 8B, for loading the disk 23, the operator first presses the disk 23 against the disk holding mechanism portion 130. As a result, the disk 23 is pressed against the slanting portions 126b of the three claw-like members 126 from the upper side, and is loaded onto the turntable 121. At this time, each of the claw-like members 126 is pushed and retracted by the disk 23 against the bias of the resilient member 127 to slide toward the inner periphery of the disk 23 along the guide grooves 125b.

When the disk 23 is further pushed, the inner peripheral edge of the disk 23 moves past the ball end portions 126d of the claw-like members 126. During this operation, a lower edge of the inner peripheral edge of the disk 23 abuts against the tapering portion 128a of the cone ring 128. When the disk 23 is further pushed, the cone ring 128 is moved downward against the bias of the return coil spring 129, and at the same time the position of the center of the disk 23 is regulated by the tapering portion 128a (that is, the automatic alignment of the disk 23 is effected). The return coil spring 129 is wound into a spiral configuration, and therefore when the disk 23 is pushed or pressed down, a compression space of the coil spring will not limit a retraction stroke of the cone ring 128.

The disk 23 is further pushed until it is brought into intimate contact with the slip sheet 122 bonded to the turntable 121. During this operation, the ball end portions 126d move past the disk 23 in the direction of the thickness of this disk, so that each claw-like member 126 is projected to slide along the guide grooves 125b toward the outer periphery of the disk 23 under the influence of the resilient member 127. As a result, the ball end portions 126b of the claw-like members 126 abut against an upper edge of the inner peripheral edge of the disk 23, thereby holding the disk 23 on the turntable 121 under the influence of the resilient members 127. Thus, merely by pressing the disk 23 against the disk holding mechanism portion 130 by the operator and then by pushing the disk 23, the automatic alignment and the self-holding can be completed.

Next, the unloading or removal of the disk 23 will be described with reference to FIGS. 1, 7, 8A and 8B. First, the operator lifts the disk 23 in the unloading direction. As a result, the ball end portions 126d are subjected to an upwardly-lifting force. The bosses 126a of each claw-like member 126 are engaged respectively in the radially-outermost portions of the guide grooves 125b, and are angularly moved about the radially-outermost portions of the guide grooves 125b in a direction perpendicular to the disk surface (see arrows in FIGS. 8A and 8B). At this time, the engagement projection 126c of each claw-like member 126 is angularly moved toward the turntable 121, and also the resilient member 127 is flexed or bent, and this angular movement and this flexing are both effected in the space 135. Therefore, the angular movement of the ball end portion 126d is not limited at all, and the disk 23 can be easily detached and removed from the turntable unit 136.

As described above in detail, when the force is applied to back the claw-like member 126, the claw-like member 126 is retracted to slide in the radial direction of the disk, and when the force to remove the disk 23 is applied, the claw-like member 126 is angularly moved upwardly about the radially-outermost portions of the guide grooves 125b in the direction perpendicular to the disk surface. The resilient member 127 can be flexed or bent downwardly. Namely, each claw-like member 126 is received in the center hub 125, and is slidable in the radial direction of the disk, and is angularly movable. With this construction, the disk holding mechanism portion 130 can be formed into a thin design, and also the operator can effect the automatic alignment and self-holding of the disk with the simple operation. Also, since the disk 23 can be easily removed with a small force, an undue force will not be applied to the disk.

Figure 10:
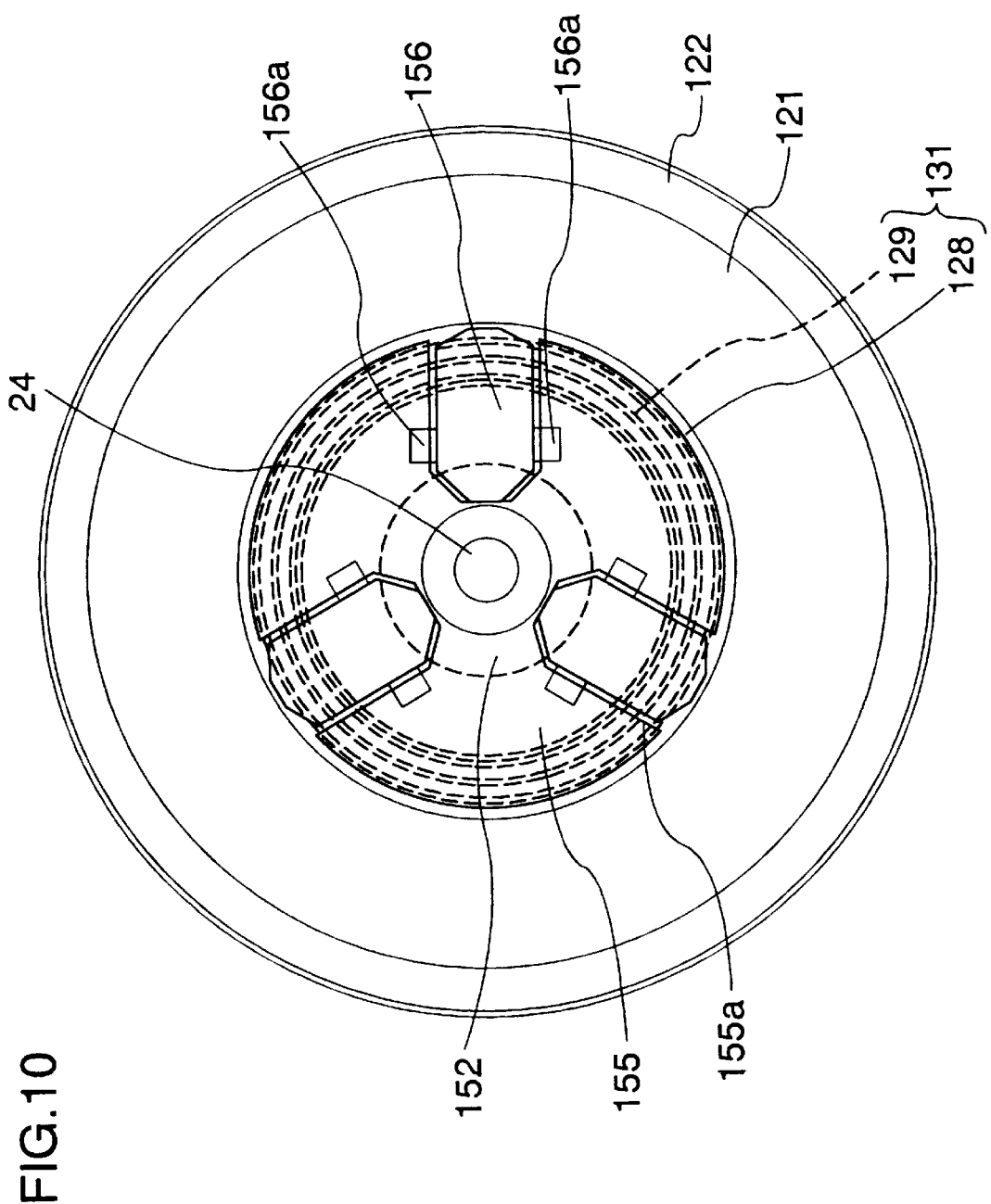
FIG. 10 is a plan view of the disk holding device of FIG. 9.

Next, urging means, which can replace the resilient members 127, will be described. FIG. 9 is a cross-sectional view of a disk holding device using this urging means, and FIG. 10 is a plan view thereof. In FIGS. 9 and 10, a disk alignment mechanism portion 131 is mounted on a turntable unit 136, and a disk holding mechanism portion 150 is mounted coaxially with the disk alignment mechanism portion 131. This basic construction is identical to that described above for FIG. 1, and therefore explanation of the turntable unit 136 and the disk alignment mechanism portion 131 will be omitted.

The disk holding mechanism portion 150 comprises a center hub 155 (serving as a main component), claw-like members 156, and an O-ring 152. Center hub windows 155a are formed, for example, in three portions of the center hub 155, respectively, and are circumferentially spaced 120 degrees from one another. A reverse side of the center hub window 155a has the same construction as described above for FIG. 1.

Each claw-like member 156 has bosses 156a engaged respectively in guide grooves 155b, and is supported on the center hub 155 in such a manner that it is slidable in the radial direction of the disk, and also is angularly movable about radially-outermost portions of the guide grooves 155b in a direction perpendicular to the disk surface. A distal end portion of the claw-like member 156 has the same configuration as described above for FIGS. 4A to 4D.

The configuration of a radially-inner end portion of the center hub window 155a and the configuration of a radially-inner end portion of the claw-like member 156 are different from those described above for FIGS. 1 and 4A to 4D. The O-ring 152 in the form of an annular elastic ring having a substantially circular cross-section is provided at the radially-inner portions of the center hub windows 155a. The radially-inner end of the claw-like member 156 is extended to abut against the O-ring 152. An inner peripheral surface of the O-ring 152 is held in contact with an O-ring stopper 153, and hence is prevented from displacement. Therefore, the O-ring 152 is provided between the center hub 155 and the O-ring stopper 153. More specifically, the difference between this construction and the construction of FIG. 1 is that the O-ring 152 performs the same function as the resilient members 127 of FIG. 1 do.

The disk holding mechanism 150 of the above construction, in which the O-ring 152 is used instead of the resilient members 127, achieves a self-retaining function totally similar to that described above. In this case, the number of the component parts is smaller, and also an assembling and adjusting process can be made simpler as compared with the disk holding mechanism portion using the resilient members 127, and therefore there can be provided the inexpensive disk holding mechanism portion.
(Second Embodiment)

Figure 11:
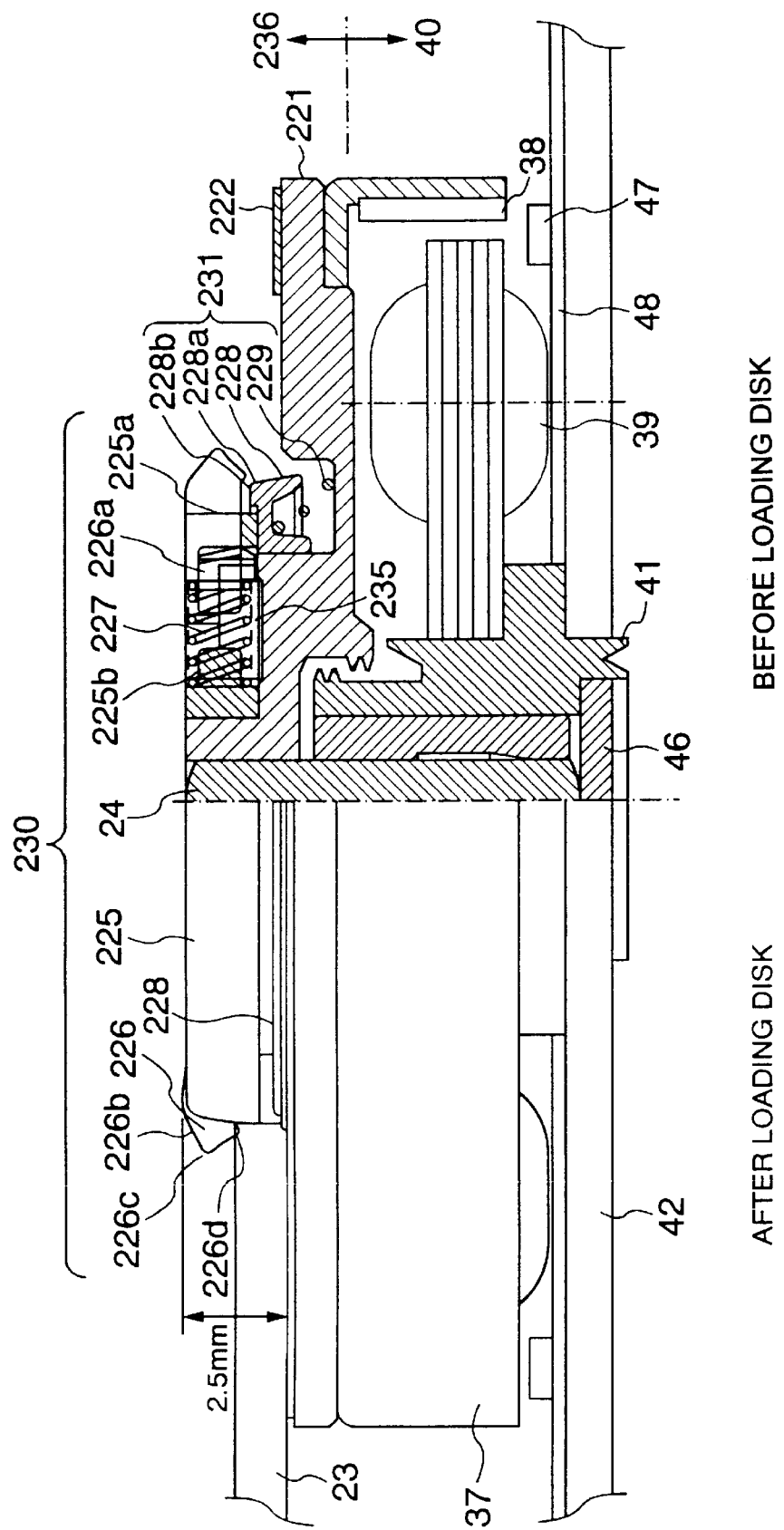
FIG. 11 is a partially cross-sectional view of a disk holding device according to a second embodiment of the invention.
Figure 12:
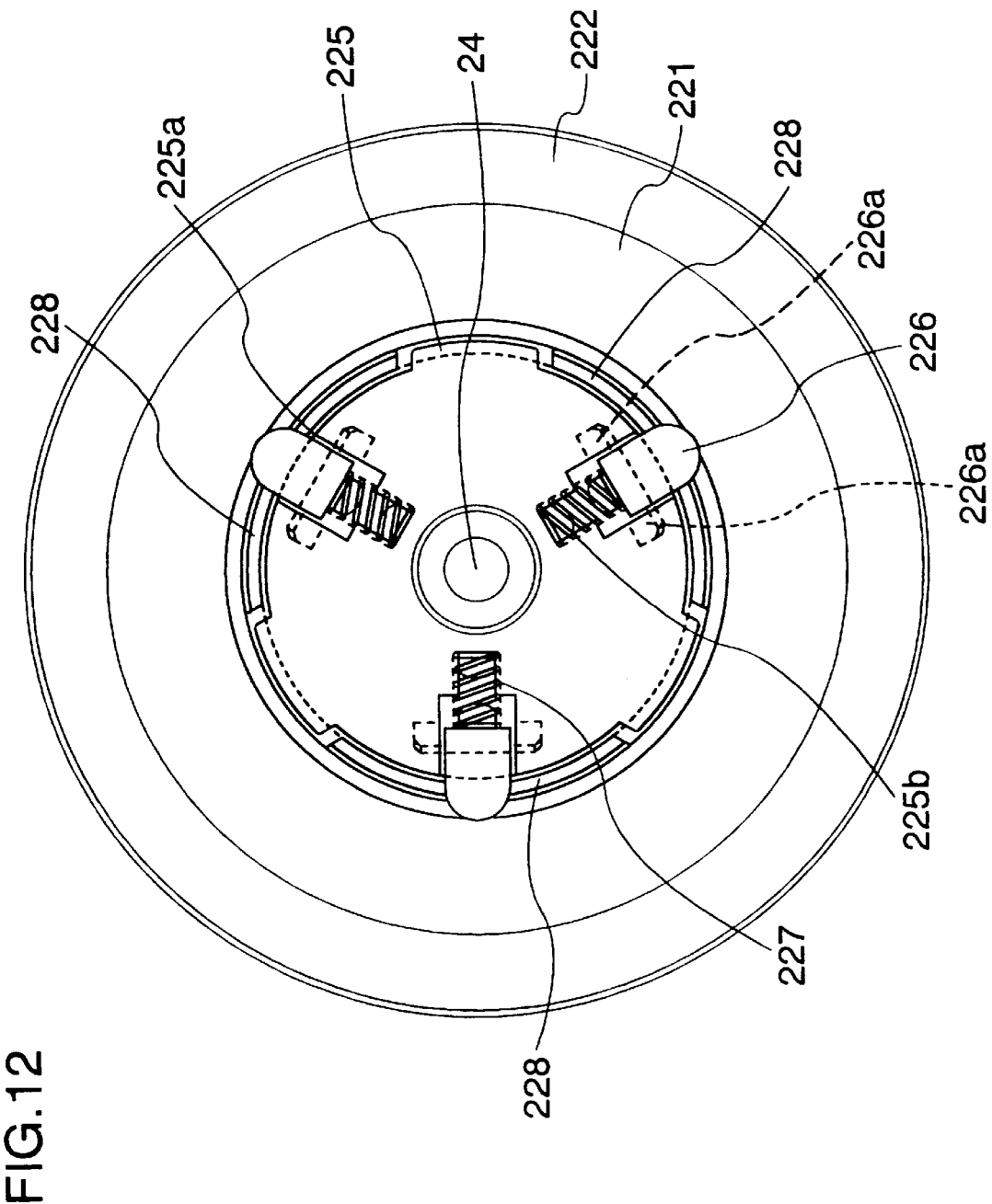
FIG. 12 is a plan view of the disk holding device of FIG. 11.
Figure 13:
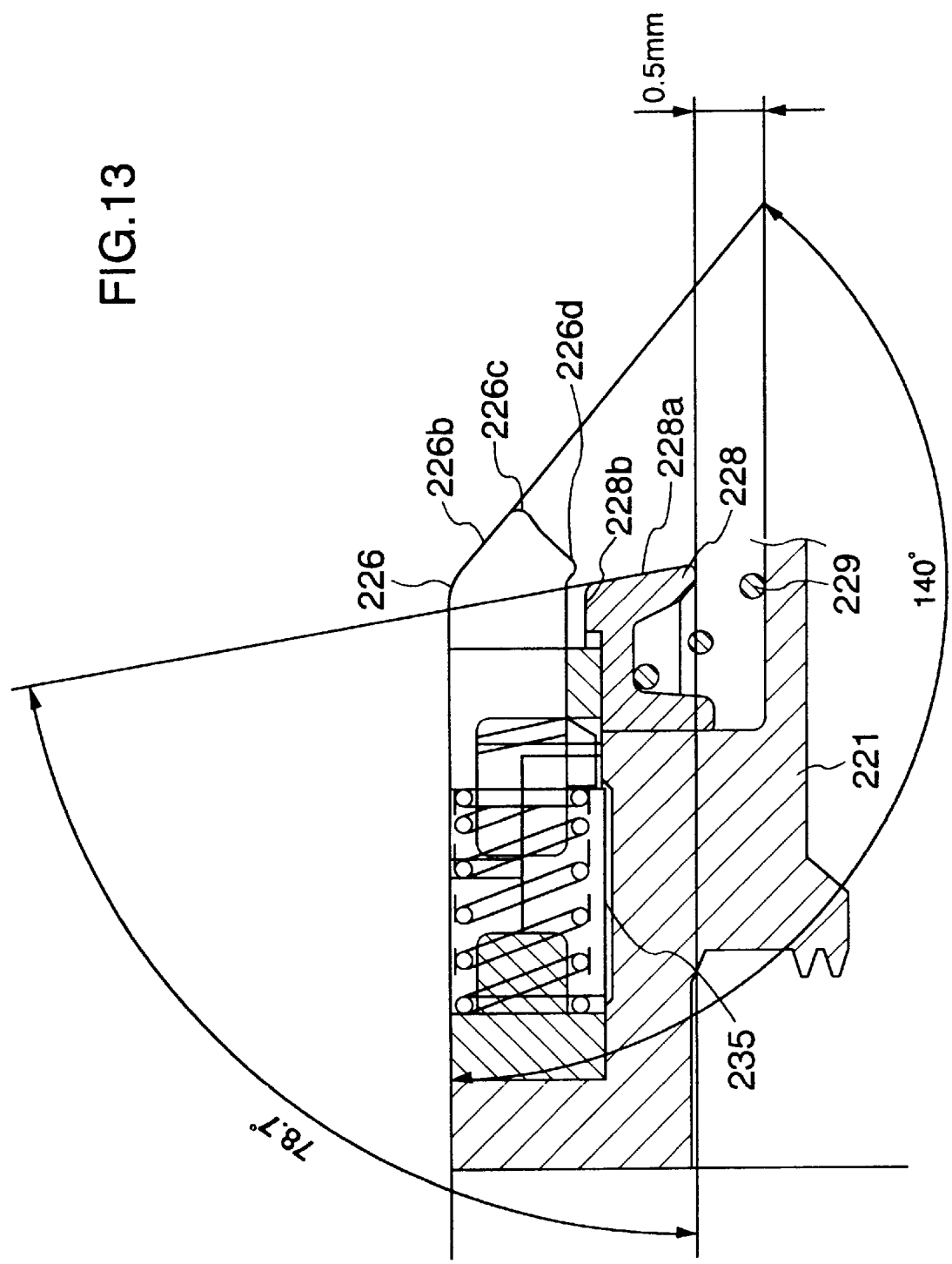
FIG. 13 is an enlarged cross-sectional view showing a claw-like member before the disk is loaded.

FIG. 11 is a partially cross-sectional view of a second embodiment of a disk holding device of the invention. FIG. 12 is a plan view of the disk holding device of FIG. 11. FIG. 13 is an enlarged, cross-sectional view showing a claw-like member 226 before a disk is loaded. In FIG. 11, a right side on a central spindle shaft 24 is a cross-sectional view of the disk holding device, showing a condition before the disk is loaded whereas a left side on the spindle shaft 24 is a side-elevational view showing a condition after the disk is loaded.

A disk alignment mechanism portion 231 for aligning the disk 23 is mounted on a turntable unit 236. A disk holding mechanism portion 230 for self-holding the disk 23 is mounted coaxially on the spindle shaft 24, and is disposed on the disk alignment mechanism portion 231. As in the first embodiment, the two kinds of mechanism portions are combined together to form an integral construction.

On the other hand, a drive portion 40 has the same construction as that of the first embodiment and the conventional device, and therefore identical portions will be designated by identical reference numerals, respectively, and explanation thereof will be omitted.

Figure 14A:
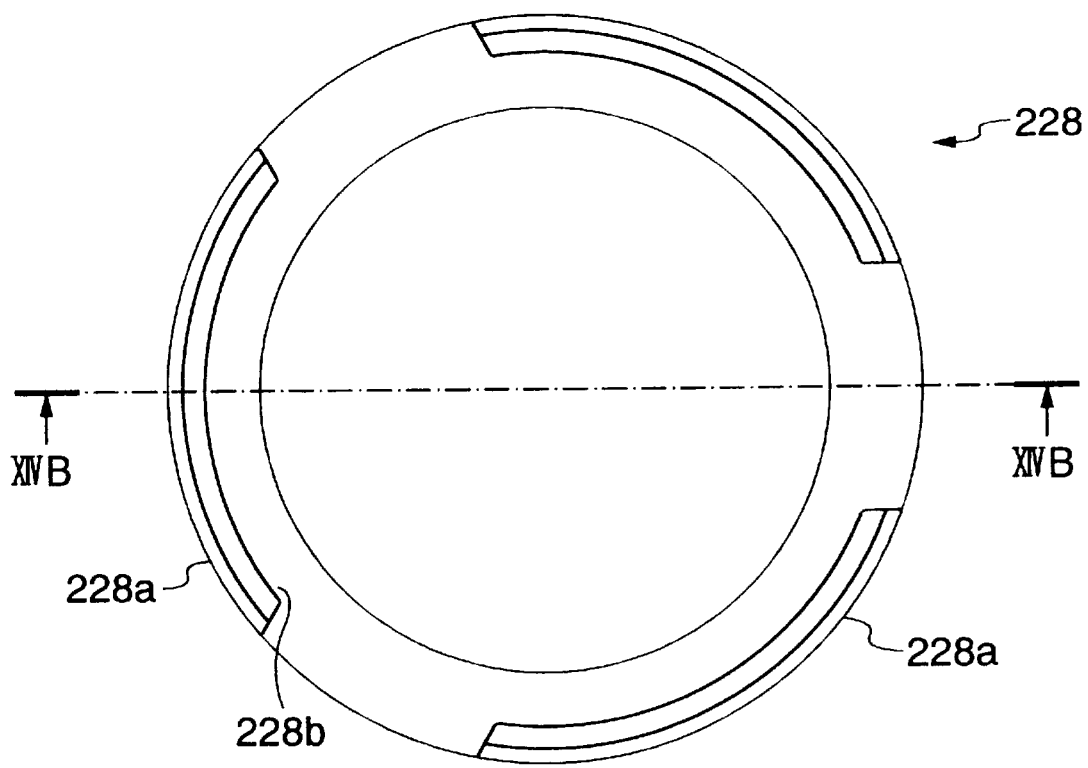
FIG. 14A is an enlarged plan view of a cone ring.
Figure 14B:
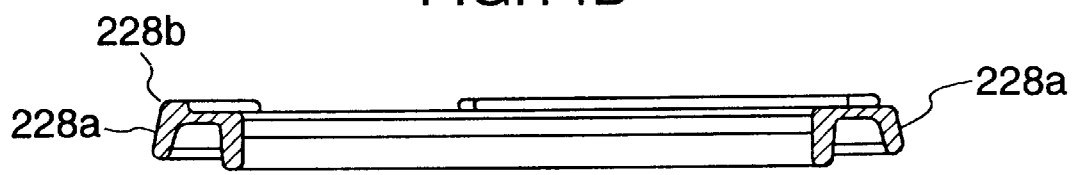
FIG. 14B is an enlarged cross-sectional view taken along the line XIVB—XIVB of FIG. 14A.

The disk alignment mechanism portion 231 comprises a cone ring 228 and a return coil spring 229. FIGS. 14A and 14B are enlarged views showing the cone ring 228. As shown in detail in FIGS. 14A and 14B, projected portions 228*b* of the cone ring 228 are disposed in an extension of a tapering portion 228*a* of the cone ring 228, and are provided respectively at three regions of the outer peripheral portion of the disk holding mechanism portion 230, and extend in a circumferential direction. The amount of projection of each protected portion 228*b* is about 20% of the overall thickness of the cone ring 228. The cone ring 228 is disposed at a lower side of the disk holding mechanism portion 230. The cone ring 228 is slidably mounted on a turntable 221, and the whole of the cone ring 228 is movable in a direction perpendicular to the disk surface. A slip sheet 222 for imparting an appropriate sliding friction torque to the disk 23 is bonded to a predetermined outer peripheral portion of the turntable 221, an inner periphery of this predetermined outer peripheral portion being radially spaced 12 mm from the center of the turntable 221 while its outer periphery is radially spaced 14 mm from the center.

The return coil spring 229 acts between a recessed portion (which defines a lower limit of the sliding movement of the cone ring 228) of the turntable 221 and a recessed portion in a reverse side of the cone ring 228. Therefore, the cone ring 228 is urged in a disk-unloading direction by the return coil spring 229. The return coil spring 229 is wound into a conical shape (see FIG. 11). The upward sliding movement of the cone ring 228 is limited by a center hub 225.

With this construction, it is not necessary to provide any limitation member, such as a C-ring, heretofore required, and therefore the disk alignment mechanism portion 231 of the invention has a simple construction, and its manufacturing process is simplified, and the cost can be reduced. Also, the influence of the diameter of the return coil spring 229, which would be encountered when pushing the cone ring 228 a full stroke, is eliminated.

That surface of the cone ring 228 for engagement with the inner peripheral edge of the disk 23 is formed into a tapering (slanting) surface or portion 228*a* of a substantially conical shape decreasing in diameter progressively in the disk-unloading direction. Here, as shown in FIGS. 13, 14A and 14B, if the maximum region of sliding movement of the cone ring 228 (in a thrust direction when loading the disk) is set to 0.5 mm, the good aligning effect is achieved (that is, the alignment is effected in a best-balanced manner) when the angle of inclination of the tapering portion 228*a* with respect to a plane (horizontal plane) perpendicular to the spindle shaft 24 is set to the range of between 68.7° and 88.7°, and the optimum inclination angle is 78.7°. The inner peripheral edge of the disk 23 engages the tapering portion 228*a*, and further depending on the configuration of the inner peripheral edge, it is positively brought into engagement with the claw-like members 226 through the projected portions 228*b* formed in the extension of the tapering portion 228*a*.

With this construction, even if there are variations in the inner diameter of the disk 23, this inner diameter variation can be absorbed by the tapering portion 228*a*. Therefore, the disk 23 is aligned, and also is held on the turntable 221.

Figure 15A:
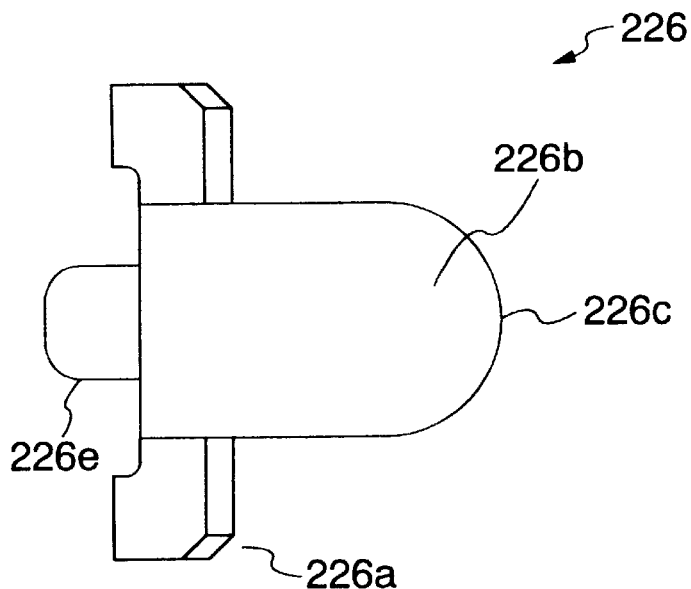
FIGS. 15A, 15B and 15C are respectively a top view, a side-elevational view and a bottom view of the claw-like member on an enlarged scale.
Figure 15B:
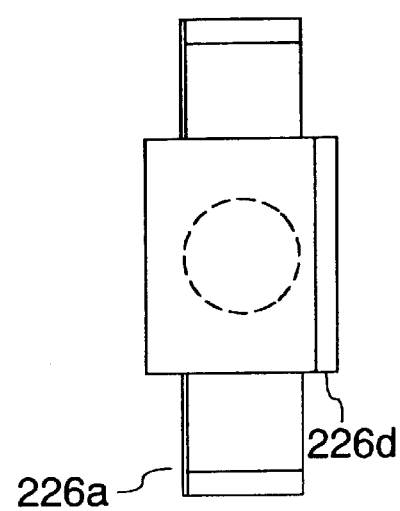
Figure 15C:
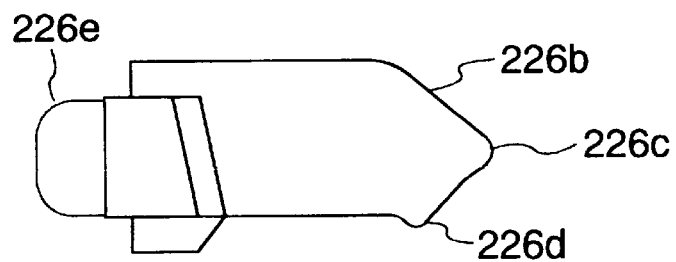
Figure 16C:
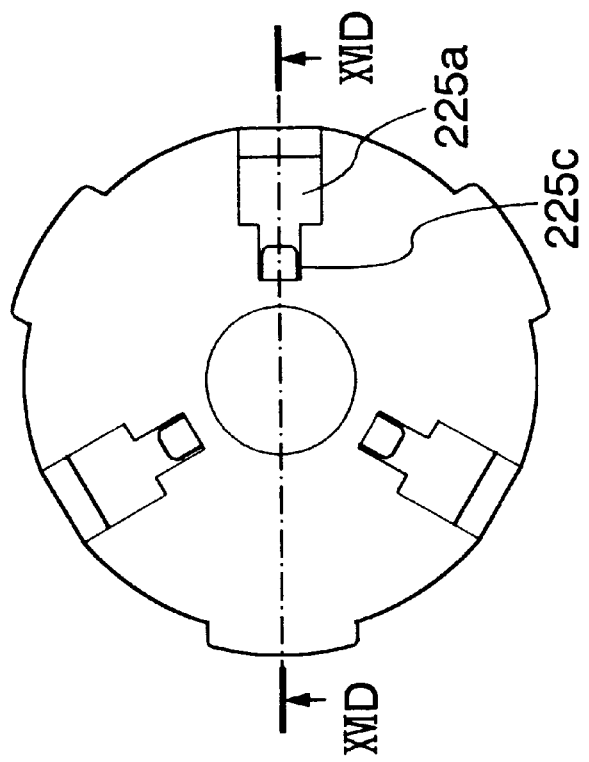
FIG. 16C is an enlarged bottom view of the center hub.
Figure 16D:
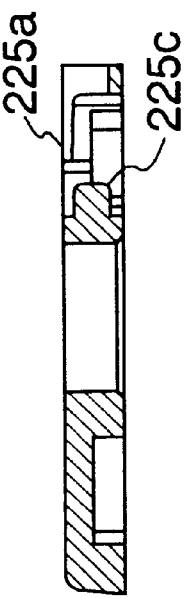
FIG. 16D is a cross-sectional view taken along the line XVIE—XVIE of FIG. 16C.
Figure 16A:
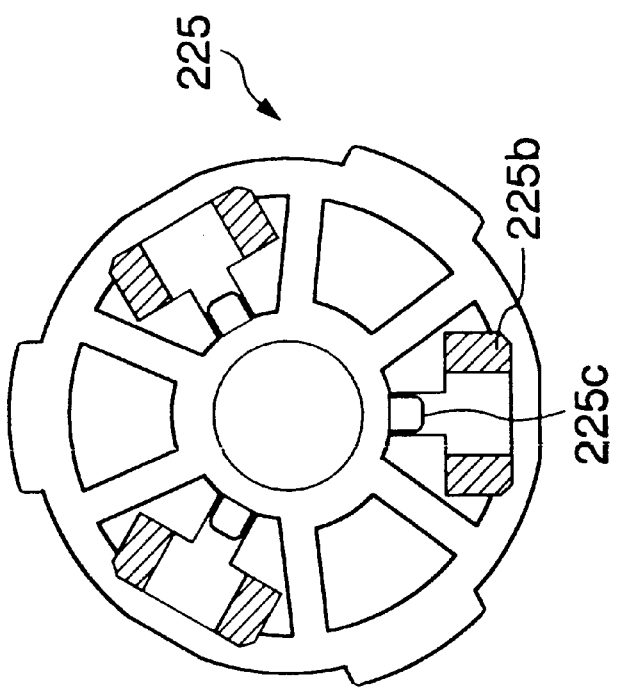
FIG. 16A is an enlarged plan view of a center hub.
Figure 16B:
FIG. 16B is an enlarged side-elevational view of the center hub.

As shown in FIGS. 11 and 12, in the disk holding mechanism portion 230, the claw-like members 226 are arranged, for example, at three regions of the outer peripheral portion of the center hub 225, respectively, and are circumferentially spaced 120 degrees from one another. FIGS. 15A to 15C show the claw-like member 226 on an enlarged scale, and FIGS. 16A to 16D show the center hub 225 on an enlarged scale.

In FIGS. 11, 12, 13 and 15A to 15C, the claw-like member 226 of a generally cross-shape has bosses 226 formed respectively on opposite sides thereof, and an engagement projection 226*e* formed at its rear end. A distal end portion of the claw-like member 226 has a slanting portion 226*b* decreasing the thickness progressively toward its distal end (that is, toward the outer periphery of the disk). If the angle of inclination of the slanting portion 226*b* with respect to the plane (horizontal plane) perpendicular to the spindle shaft 24 is set to the range of between 130° and 150°, a good disk-loading effect is achieved, and the optimum inclination angle is 140°. A projected distal end portion 226*c* of the claw-like member 226 forms a curved line of a modified oval cross-section (see FIGS. 15A to 15C), and includes a reversely-slanting surface disposed generally perpendicular to the slanting surface 226*b*, and a lower projected portion 226*d* defined by a surface extending from the reversely-slanting surface. The amount of projecting of the lower projected portion 226*d* is about 10% of the overall thickness of the claw-like member 226. The claw-like member 226 is made, for example, of a resin.

With this configuration of the claw-like member 226 having the lower projected portion 226*d*, when the thinnest one of the disks, which can be used in a disk drive unit, is loaded, this disk can be positively held by the lower projected portions 226*d* of the claw-like members 226. And besides, with this construction of the disk holding mechanism portion 230, the overall thickness of this mechanism portion 230 can be reduced, and also a force, required for removing or unloading the optical disk 23, can be reduced.

Center hub windows 225*a* are formed respectively in three portions of the center hub 225 spaced circumferentially 120 degrees from one another. Guide grooves 225*b* are formed at a reverse side of the center hub window 225*a,* and an engagement projection 225*c* is provided at a radially-inner end of the center hub window 225*a*. The bosses 226*a* of each claw-like member 226 are engaged respectively in the guide grooves 225*b* of the associated center hub window 225*a*. The claw-like member 226 is supported on the center hub 225, with the bosses 226*a* engaged respectively in the guide grooves 225*b*, in such a manner that the claw-like member 226 is slidable in the radial direction of the disk, and also is angularly movable about the radially-outermost portions of the guide grooves 225*b* in a direction perpendicular to the disk surface.

A resilient member 227 extends between each engagement projection 225*c* of the center hub 225 and the engagement projection 226*e* of the associated claw-like member 226, and is received in the center hub 225. The resilient member 227 comprises, for example, a compression spring.

Spaces 235 for allowing the bending of the resilient members 227 are formed respectively in those portions of the turntable 221 disposed respectively beneath the three resilient members 227. Therefore, each claw-like member 226 is urged toward the outer periphery of the disk by the resilient member 227, so that the bosses 226a are engaged respectively in the radially-outermost portions of the guide grooves 225b in a stand-by condition.

As shown in FIG. 11, the turntable unit 236 of the above construction can be formed into a total thickness of not more than 4.0 mm (for example, 3.75 mm), and more specifically the dimension of its disk-unloading side portion, measured from the disk-mounting surface (that is, the upper surface of the slip sheet 222), is not more than 2.7 mm (for example, 2.5 mm), and the dimension of its disk-loading side portion (close to the turntable 221), measured from the disk-mounting surface, is not more than 1.3 mm (for example, 1.25 mm)(not shown but similar with the showing of FIG. 7).

Figure 17:
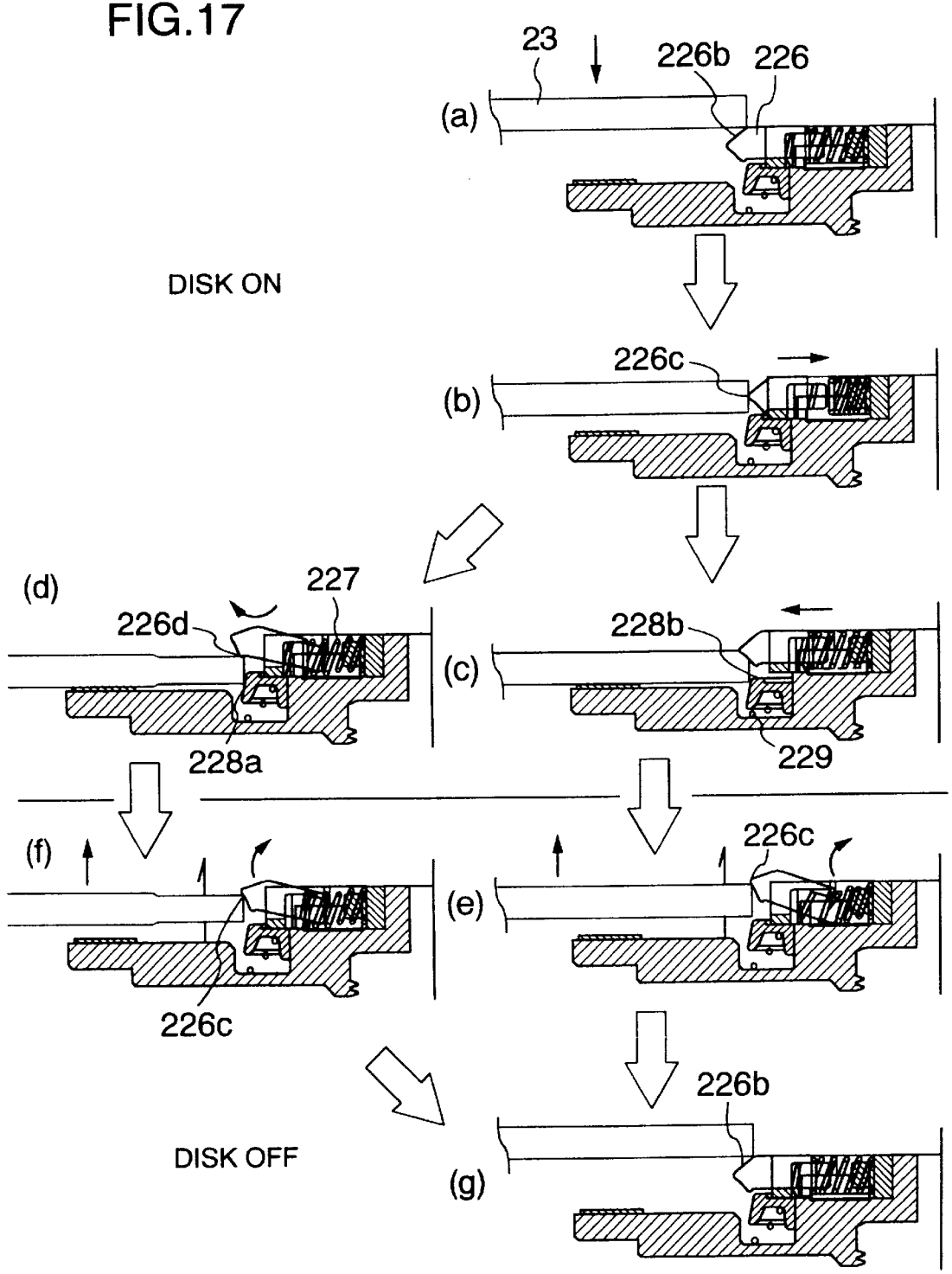
FIG. 17 is an illustration showing disk loading and disk unloading operations of the disk holding device of FIG. 11.

The disk loading and unloading operations of the turntable unit 236 of the above construction will now be described. FIG. 17 is a view showing the disk loading and unloading operations by the disk holding device of FIG. 11. The correlation between the disk holding mechanism portion 230 and the disk alignment mechanism portion 231 of the invention, as well as the operation of the claw-like members 226 during the loading and unloading of the disk 23, will be described in detail with reference to FIGS. 11, 13 and 17.

First, the disk loading operation will be described. The operator presses the disk 23 against the disk holding mechanism portion 230 (FIG. 17(a)). As a result, the disk 23 is pressed against the slanting portions 226b of the three claw-like members 226 from the upper side, and is loaded onto the turntable 221. At this time, each of the claw-like members 226 is pushed and retracted by the disk 23 against the bias of the resilient member 227 to slide toward the inner periphery of the disk 23 along the guide grooves 225b (FIG. 17(b)).

When the disk 23 is further pushed, the inner peripheral edge of the disk 23 passes past the projected distal end portions 226c of the claw-like members 226. During this operation, a lower edge of the inner peripheral edge of the disk 23 abuts against the tapering portion 228a of the cone ring 228. When the disk 23 is further pushed, the cone ring 228 is moved downward against the bias of the return coil spring 229, and at the same time the position of the center of the disk 23 is regulated by the tapering portion 228a (that is, the automatic alignment of the disk 23 is effected). The return coil spring 229 is wound into a spiral configuration, and therefore when the disk 23 is pushed or pressed down, a compression space of the coil spring will not limit a retraction stroke of the cone ring 228.

The disk 23 is further pushed until it is brought into intimate contact with the slip sheet 222 bonded to the turntable 221. During this operation, the projected distal end portion 226c pass past the disk 23 in the direction of the thickness of this disk, so that each claw-like member 226 is projected to slide along the guide grooves 225b toward the outer periphery of the disk 23 under the influence of the resilient member 227.

At this time, if the disk 23 has a standard thickness, the reversely-slanting surfaces and projected distal end portions 226d (each continuous with the associated reversely-slanting surface) of the claw-like members 226 abut against an upper edge of the inner peripheral edge of the disk 23, thereby holding the disk 23 on the turntable 221 under the influence of the resilient members 227 (FIG. 17(c)). On the other hand, if the disk 23 has a smaller thickness, the projected distal end portion 226d of each claw-like member 226 abuts against the upper edge of the inner peripheral edge of the disk 23, and further is brought into engagement with the upper surface of the disk 23, thereby holding the disk 23 on the turntable 221 (FIG. 17(d)). Thus, merely by pressing the disk 23 against the disk holding mechanism portion 230 by the operator and then by pushing the disk 23, the automatic alignment and the self-holding can be completed.

Next, the unloading or removal of the disk 23 will be described. First, the operator lifts the disk 23 in the unloading direction. As a result, the reversely-slanting surface and projected distal end portion 226d (continuous therewith) of each claw-like member 226 are subjected to an upwardly-lifting force. The bosses 226a of each claw-like member 226 are engaged respectively in the radially-outermost portions of the guide grooves 225b, and the claw-like member 226 is angularly moved about the radially-outermost portions of the guide grooves 225b in a direction perpendicular to the disk surface (see arrows in FIGS. 17(e) and 17(f)). At this time, the engagement projection 226e of each claw-like member 226 is angularly moved toward the turntable 221, and also the resilient member 227 is flexed or bent, and this angular movement and this flexing are both effected in the space 235. Therefore, the angular movement of the reversely-slanting surface and projected distal end portion 226d (continuous therewith) of the claw-like member 226 is not limited at all, and the disk 23 can be easily detached and removed from the turntable unit 236 (FIG. 17(g)).

As described above in detail, when the force to push the claw-like member 226 back is applied, the claw-like member 226 is retracted to slide in the radial direction of the disk, and when the force to remove the disk 23 is applied, the claw-like member 226 is angularly moved upwardly about the radially-outermost portions of the guide grooves 225b in the direction perpendicular to the disk surface. The resilient member 227 can be flexed or bent downwardly. Namely, each claw-like member 226 is received in the center hub 225, and is slidable in the radial direction of the disk, and is angularly movable. With this construction, the disk holding mechanism portion 230 can be formed into a thin design, and also the operator can effect the automatic alignment and self-holding of the disk with the simple operation. And besides, since the disk 23 can be easily removed with a small force, an undue force will not be applied to the disk.

Next, the balance between the force of the aligning function and the force of the self-holding function in the above operation will be described in further detail. As shown in FIG. 11, the disk 23 is mounted on the slip sheet 222, bonded to the turntable 221, while maintaining a certain static friction coefficient. As a result, a slip force, withstanding an angular acceleration developing when the disk 23 is rotated, is produced. If this slip force is too large or too small, the disk holding device can not properly function. This slip force is produced by the holding force with which the three claw-like members 226 are pressed against the upper edge portion of the center hole in the disk 23. The larger the holding force becomes, the larger the slip force becomes.

This holding force is also influenced by the pushing force applied uniformly to the lower edge portion of the center hole in the disk 23 by the cone ring 228. With the increase of the holding force, the force of the urging means (for example, the spring force of the return coil spring 229), urging the cone ring 228 in the disk-unloading direction, must be increased; otherwise, the disk can not be aligned in a well-balanced manner.

Therefore, with respect to the relationship of these three forces, the spring force of the compressed resilient members 227, required to self-hold the disk by the three claw-like members 226, is set to 200 gf±50 gf. Then, in order to press the cone ring 228 uniformly against the disk, the spring force of the return coil spring 229 is set to 100 gf±50 gf, and further the slip force of the disk is set to 200 gf±50 gf. By doing so, these forces, acting on the disk, can be well balanced.

Figure 18:
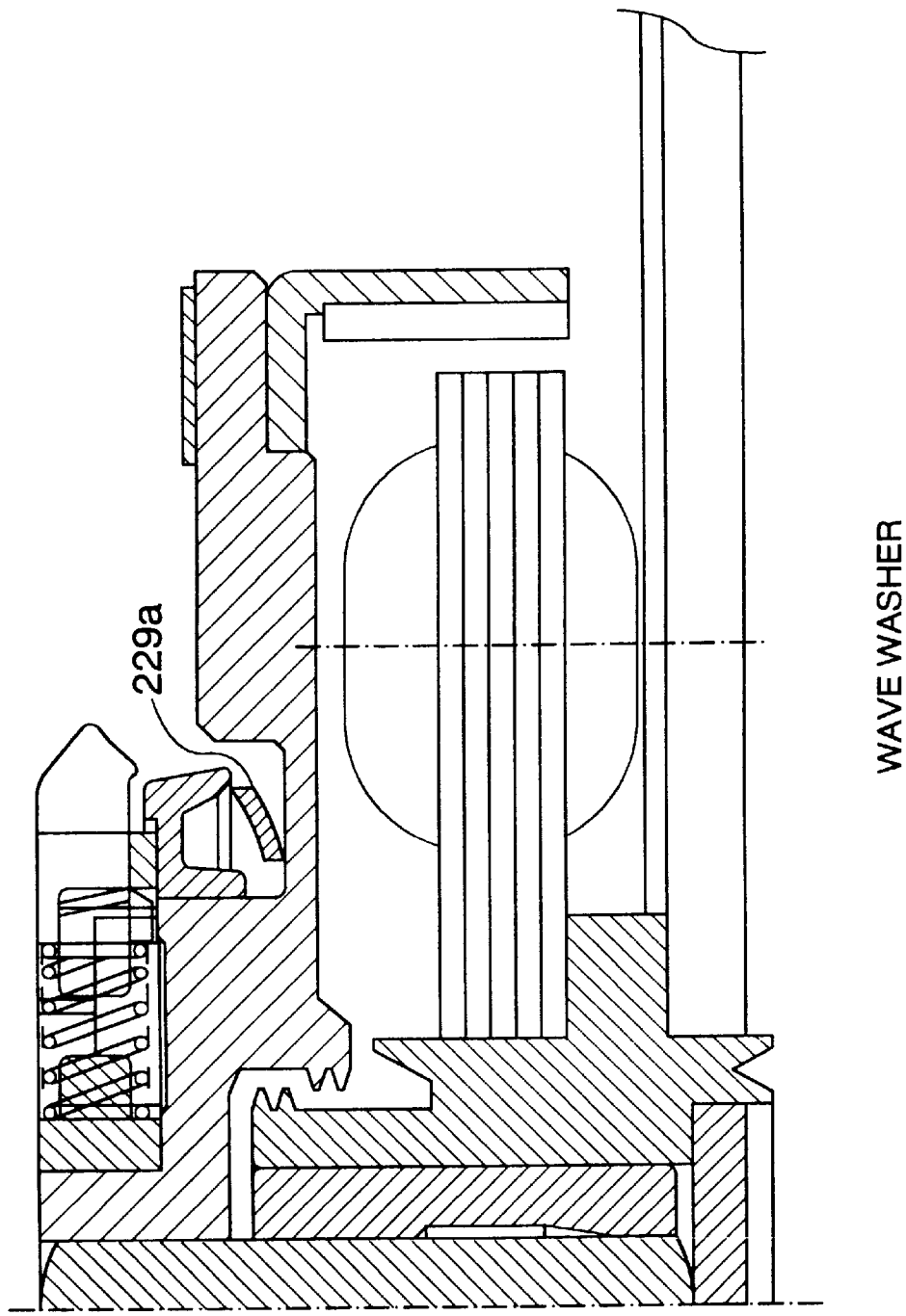
FIG. 18 is an enlarged cross-sectional view of a disk holding device using modified urging means.

Next, modified urging means, which can replace the return coil spring 229 in the disk alignment mechanism portion 231, will be described. FIG. 18 is an enlarged, cross-sectional view of a disk holding device using this modified urging means. The urging means of FIG. 18 differs from the urging means of FIG. 11 in that instead of the return coil spring 229, a wave washer 229a is provided between a turntable 221 and a cone ring 228. The other constituent elements are the same as those of FIG. 11, and the operation of the urging means and the operation of the cone ring 228 are generally similar to those in the first embodiment.

Features, obtained by the use of this wave washer 229a, will be described. The wave washer 229a has such a wavy configuration that the bottom of each wave thereof is held in contact with a recessed portion of the turntable 221 while the top (crest) of each wave thereof is held in contact with a lower side of the cone ring 228. The wave height between the bottom and top of the wave satisfies the range of movement of a disk alignment mechanism portion 231, that is, a region (0.5 mm) of sliding movement of the cone ring 228 in a direction of the axis thereof. Another feature, obtained by the use of the wave washer 229a, is that an optimum number of waves of the wave washer can be selected. More specifically, in this embodiment, there are provided three claw-like members 226 and three slanting portions 228a of a cone ring 228. Therefore, if the number of the crests of the waves (that is, the number of the waves) of the wave washer 229a is set to a multiple of 3, load points of the cone ring 228 are urged or pushed uniformly over the entire periphery thereof. The number of the waves is not limited to the above number, but it can be set to the range of 3 to 6, in which case also the load points of the cone ring 228 are urged uniformly over the entire periphery thereof. In this case, of course, the urging force is set to a value equal to the spring force (100 gf±50 gf) of the above-mentioned return coil spring 229. The deformation of the waves, which produces this urging force, is effected between the recessed portion of the turntable 221 and the lower side of the cone ring 228, and therefore the region (0.5 mm) of sliding movement of the cone ring 228 in the axial direction is not affected at all. Therefore, with the thin-design construction, the self-holding and the automatic alignment of the center hole portion of the disk can be effected.

Figure 19:
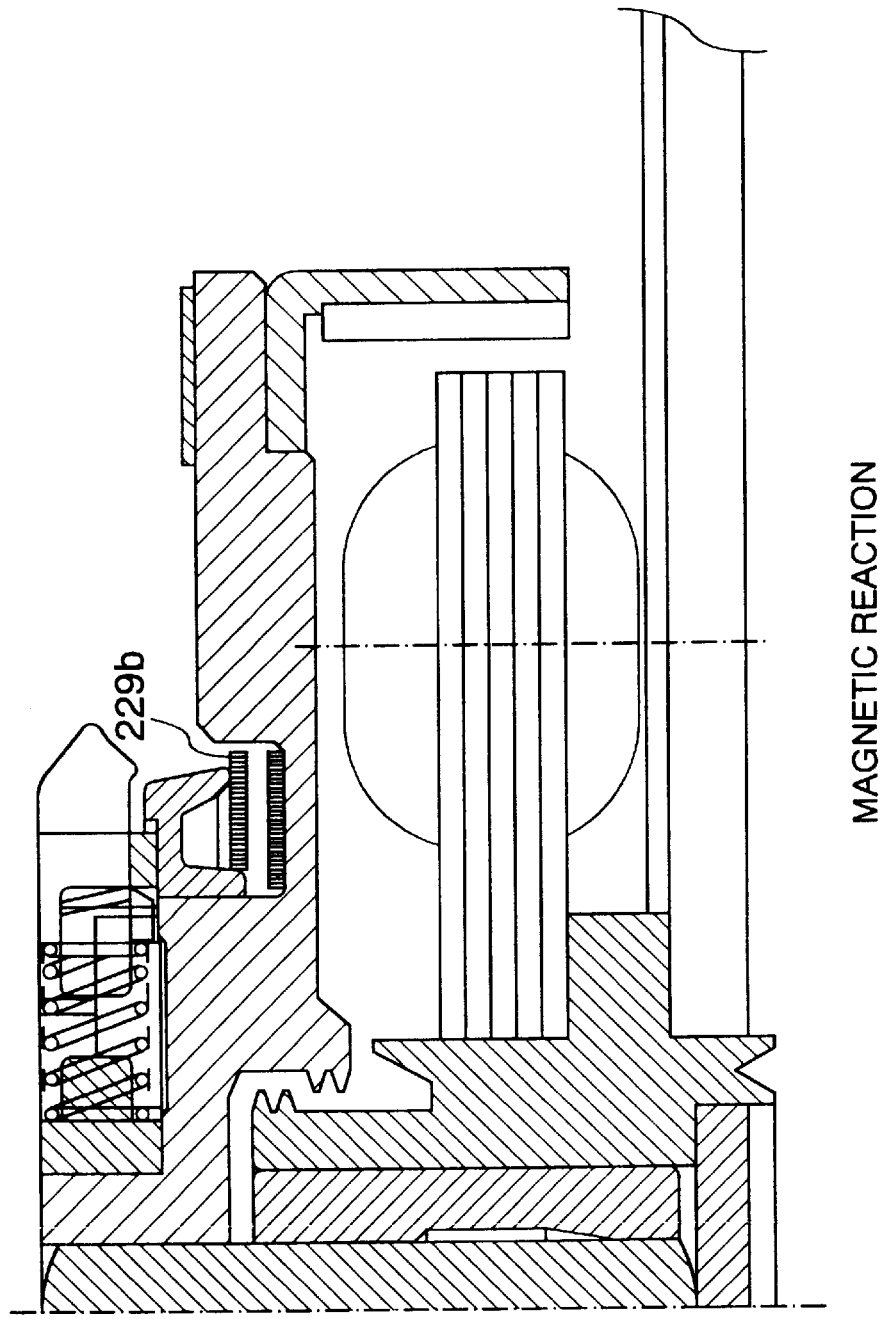
FIG. 19 is an enlarged cross-sectional view of a disk holding device using another modified urging means.

Next, another modified urging means, which can replace the return coil spring 229 in the disk alignment mechanism portion 231, will be described. FIG. 19 is an enlarged, cross-sectional view of a disk holding device having this modified urging means. The urging means of FIG. 19 differs from the urging means of FIG. 11 in that instead of the return coil spring 229, magnets 229b are provided between a turntable 221 and a cone ring 228. The other constituent elements are the same as those of FIG. 11, and the operation of the urging means and the operation of the cone ring 228 are generally similar to those in the first embodiment.

Features, obtained by the use of the magnets 229b, will be described. In FIG. 19, the magnets 229a are arranged in such a manner that their surfaces of the same pole (for example, their surfaces each having a N pole or a S pole) are opposed to each other. Also, the magnets 229b are arranged to provide such an air gap as to enable a disk alignment mechanism portion 231 to achieve its function. Under no load (that is, in a condition in which the disk is not loaded), a magnetic repulsion force of the magnets 229b is set to 100 gf±50 gf as described above for the spring force of the abovementioned return coil spring 229. The magnet 229b comprises an annular ferromagnetic body, and may be magnetized over an entire circumference thereof, or may be magnetized at regions spaced circumferentially from one another. Alternatively, sector-shaped ferromagnetic pieces may be arranged at equal intervals in the circumferential direction. With this construction, the load points of the cone ring 228 are urged uniformly over the entire periphery thereof. Therefore, with the thin-design construction, the self-holding and the automatic alignment of the center hole portion of the disk can be effected.

(Third Embodiment)

Figure 20:
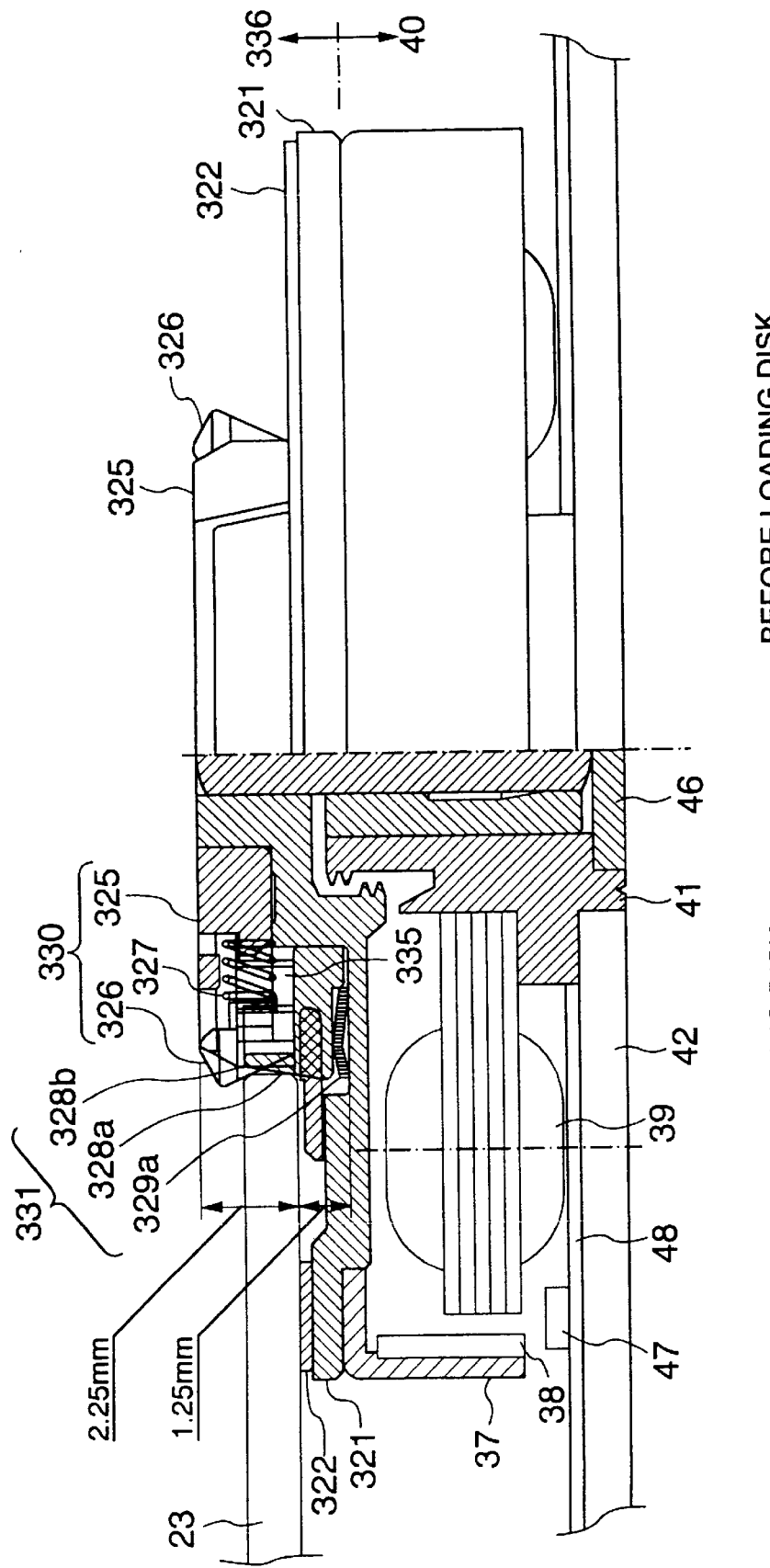
FIG. 20 is a partially cross-sectional view of a third embodiment of a disk holding device of the invention.

FIG. 20 is a partially cross-sectional view of a third embodiment of a disk holding device of the invention. In FIG. 20, a right side on a central spindle shaft 24 is a side-elevational view of the disk holding device, showing a condition before the disk is loaded whereas a left side on the spindle shaft 24 is a cross-sectional view showing a condition after the disk is loaded.

A disk alignment mechanism portion 331 for aligning the disk 23 is mounted on a turntable unit 336. A disk holding mechanism portion 330 for self-holding the disk 23 is mounted coaxially on the spindle shaft 24, and is disposed on the disk alignment mechanism portion 331. As in the first embodiment, the two kinds of mechanism portions are combined together to form an integral construction.

On the other hand, a drive portion 40 has the same construction as that of the first embodiment and the conventional device, and therefore identical portions will be designated by identical reference numerals, respectively, and explanation thereof will be omitted.

Figure 21A:
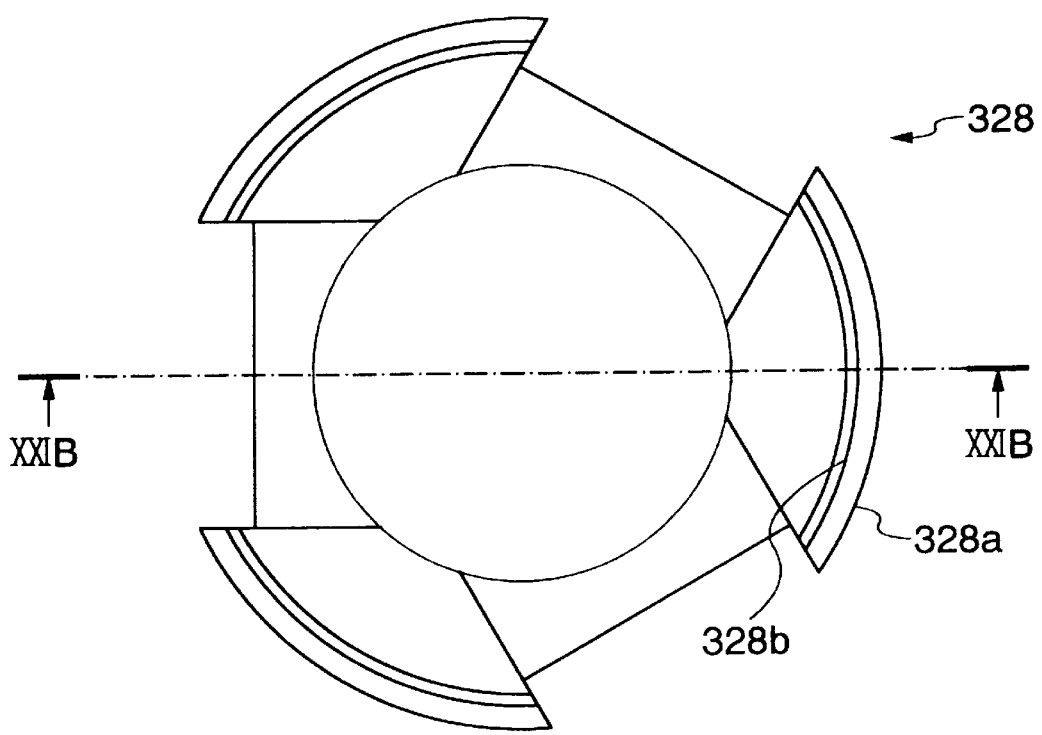
FIG. 21A is an enlarged plan view of a cone ring.
Figure 21B:
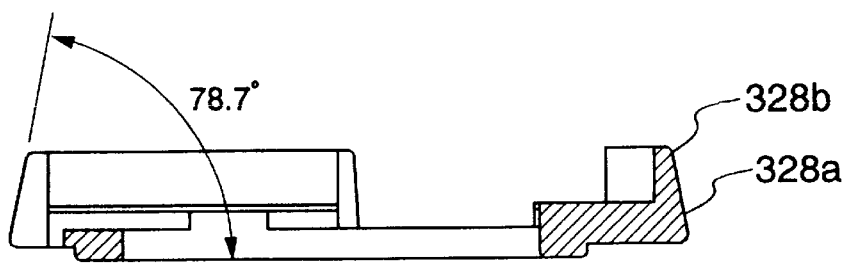
FIG. 21B is a cross-sectional view taken along the line XXIB—XXIB of FIG. 21A.
Figure 22A:
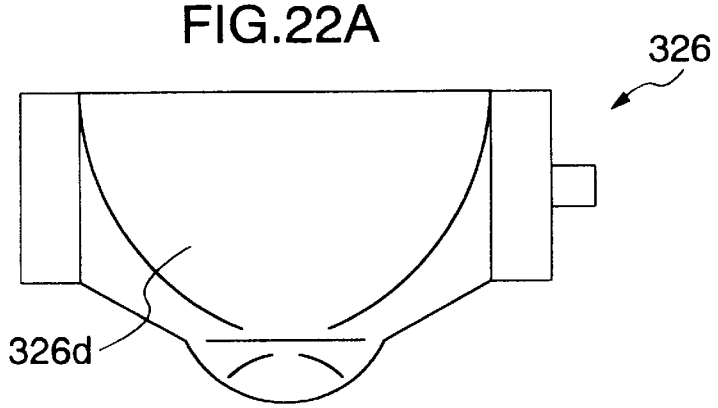
FIGS. 22A, 22B, 22C and 22D are respectively a bottom view, a plan view, a right side-elevational view and a lower-side view of a claw-like member on an enlarged scale.
Figure 22B:
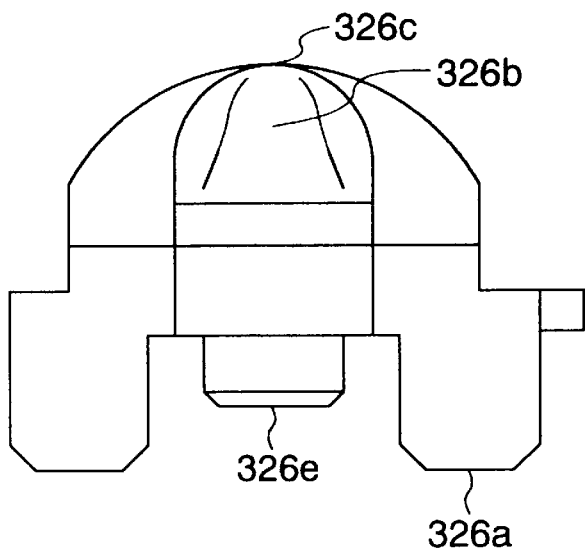
Figure 22C:
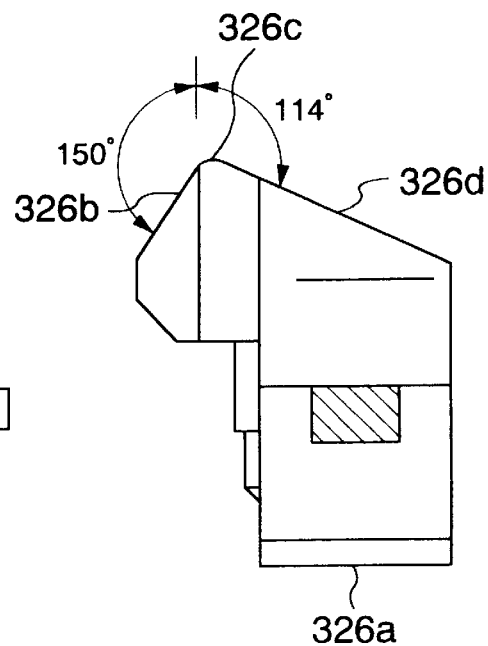
Figure 22D:
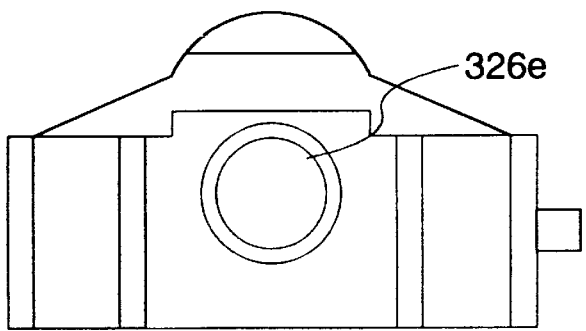
Figure 23D:
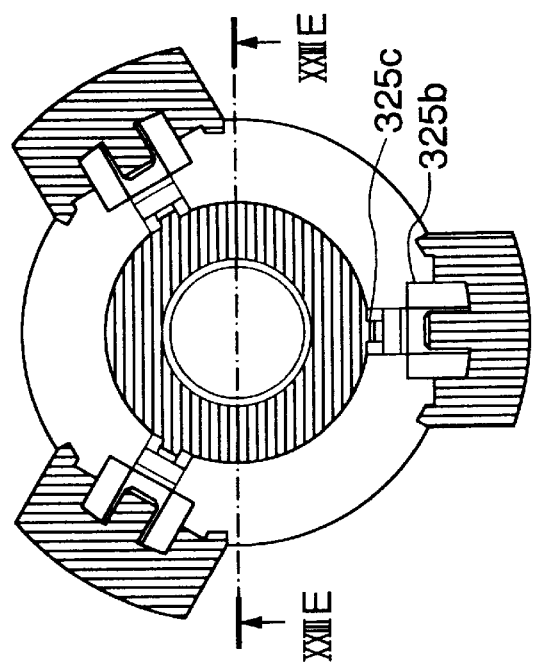
FIG. 23D is a bottom view of the center hub.
Figure 23E:
FIG. 23E is a cross-sectional view taken along the line XXIIIE—XXIIIE of FIG. 23D.
Figure 23B:
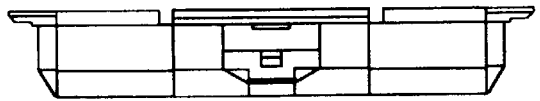
FIG. 23B is an enlarged side-elevational view of the center hub.
Figure 23A:
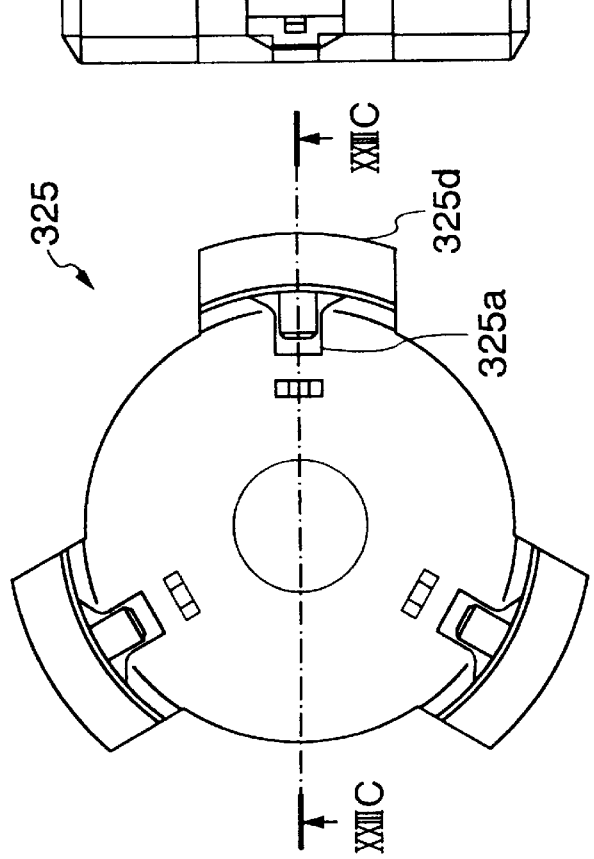
FIG. 23A is an enlarged plan view of a center hub.
Figure 23C:
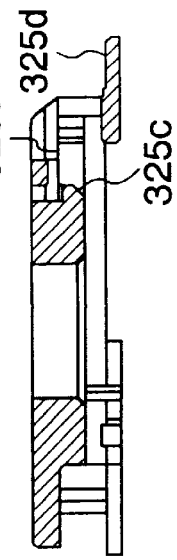
FIG. 23C is a cross-sectional view taken along the line XXIIIC—XXIIIC of FIG. 23A.

The disk alignment mechanism portion 331 comprises a cone ring 328 and a wave washer 329a. FIGS. 21A and 21B are enlarged views showing the cone ring 328. As shown in detail in FIGS. 21A and 21B, projected portions 328b of the cone ring 328 are disposed respectively in extensions of slanting portions 328a of the cone ring 328, and extend in a disk-unloading direction. The projected portions 328b are provided respectively at three regions of the outer peripheral portion of the disk holding mechanism portion 330, and extend in a circumferential direction. The length of a slanting surface of each projected portion 328b is about one to two times larger than the thickness of the disk. The cone ring 328 is disposed at a lower side of the disk holding mechanism portion 330. The cone ring 328 is slidably mounted on a turntable 321, and the whole of the cone ring 328 is movable in a direction perpendicular to the disk surface. A slip sheet 322 for imparting an appropriate sliding friction torque to the disk 23 is bonded to a predetermined outer peripheral portion of the turntable 321, an inner periphery of this predetermined outer peripheral portion being radially spaced 9 mm from the center of the turntable 321 while its outer periphery is radially spaced 14 mm from the center.

Next, description will be made of an example in which the wave washer 329a is used as urging means in the disk alignment mechanism portion 331. FIG. 20 differs from FIG. 11 in that instead of the return coil spring 229, the wave washer 329a is provided between the turntable 321 and the cone ring 328. The wave washer 329a has such a wavy configuration that the bottom of each wave thereof is held in contact with a recessed portion of the turntable 321 while the top (crest) of each wave thereof is held in contact with a lower side of the cone ring 328. The wave height between the bottom and top of the wave satisfies the range of movement of the disk alignment mechanism portion 331, that is, a maximum region (0.6 mm) (the expected stroke for the standard disk is not more than about ½ of the disk thickness, and is 0.4 mm) of sliding movement of the cone ring 328 in a direction of the axis thereof. Therefore, the cone ring 328 is urged in the disk-unloading direction. The sliding movement of the cone ring 328 is limited by a center hub 325. By the use of the wave washer 329a, an optimum number of waves of the wave washer can be selected. More specifically, in this embodiment, there are provided three claw-like members 326 and the three slanting portions 328a of the cone ring 328 as in the embodiment of FIG. 12. Therefore, if the number of the crests of the waves (that is, the number of the waves) of the wave washer 329a is set to a multiple of 3, load points of the cone ring 228 are urged or pushed uniformly over the entire periphery thereof. The number of the waves is not limited to the above number, but it can be set to the range of 3 to 6, in which case also the load points of the cone ring 228 are urged uniformly over the entire periphery thereof. The deformation of the waves, which produces this urging force, is effected between the recessed portion of the turntable 321 and the lower side of the cone ring 328, and therefore the maximum region (0.6 mm) of sliding movement of the cone ring 328 in the axial direction is not affected at all. Therefore, with the thin-design construction, the self-holding and the automatic alignment of the center hole portion of the disk can be effected.

With the above construction, it is not necessary to provide any limitation member, such as a C-ring, heretofore required, and therefore the disk alignment mechanism portion 331 of the present invention has a simple construction, and its manufacturing process is simplified, and the cost can be reduced. Also, the influence of the diameter of the return coil spring 329, which would be encountered when pushing the cone ring 328 to an end of the maximum sliding region, is eliminated.

Those surfaces of the cone ring 328 for engagement with the inner peripheral edge of the disk 23 are formed respectively into the slanting portions 328a each defined by part of a substantially conical shape decreasing in diameter progressively in the disk-unloading direction. The slanting portions 328a will now be described in detail with reference to FIGS. 21A and 21B. The device is so designed that the disk can be loaded with the maximum pushing (loading) stroke of 0.6 mm. If the maximum region of sliding movement of the cone ring 328 (in a thrust direction when loading the disk) is set to 0.6 mm, a good aligning effect is achieved (that is, the alignment is effected in a best-balanced manner) when the angle of inclination of the slanting portion 328a with respect to a plane (horizontal plane) perpendicular to the spindle shaft 24 is set to the range of between 68.7° and 88.7°, and the optimum inclination angle is 78.7°. The inner peripheral edge of the disk 23 engages the slanting portions 328a, and further depending on the configuration of the inner peripheral edge, it is positively brought into engagement with the claw-like members 326 through the projected portions 328b formed respectively in the extensions of the slanting portions 328a.

As described above, each of the slanting portions 328a is defined by part of a substantially conical surface. However, depending on a desired touch obtained when loading the disk, the slanting portion 328a may be formed into part of a spherical surface in such a manner that the angle of a line tangential to the surface of the slanting portion 328a is within the range of the above inclination angle. In this case, similar effects can be achieved. The surface of the slanting portion 328a may be formed of metal or a resin. A material of a low friction coefficient, such as Teflon (polytetrafluoroethylene), may be bonded to the surface of the slanting surface 328a. These modifications can be effected in order to adjust the touch obtained when loading the disk.

With the above construction, even if there are variations in the inner diameter of the disk 23, this inner diameter variation can be absorbed by the slanting portions 328a. Therefore, the disk 23 is aligned, and also is held on the turntable 321.

As shown in FIG. 12 (showing the second embodiment) and FIG. 20, in the disk holding mechanism portion 330 of this embodiment, the claw-like members 326 are arranged, for example, at three regions of the outer peripheral portion of the center hub 325, respectively, and are circumferentially spaced 120 degrees from one another. FIGS. 22A to 22D show the claw-like member 326 on an enlarged scale, and FIGS. 23A to 23D show the center hub 325 on an enlarged scale.

In FIGS. 20 and 23A to 23D, the claw-like member 326 of a generally E-shape has bosses 326a formed respectively on opposite sides thereof, and an engagement projection 326e formed at its rear end. A distal end portion of the claw-like member 326 has a slanting portion 326b decreasing the thickness progressively toward its distal end (that is, toward the outer periphery of the disk). The slanting portion 326b forms a slanting surface slanting gently toward the distal end from an apex of a semi-spherical surface continuous with the opposite side surfaces. If the angle of inclination of the slanting portion 326b with respect to a plane (horizontal plane) perpendicular to the spindle shaft 24 is set to the range of between 140° and 160°, a good disk-loading effect is achieved, and the optimum inclination angle is 150°.

A projected distal end portion 326c of the claw-like member 326 forms a curved surface (see FIGS. 22A to 22D) having an apex into which the upper, lower, right and left surfaces merge. The projected distal end portion 326c has a reversely-slanting flat lower surface 326d disposed generally perpendicular to the slanting surface 326b, and this reversely-slanting flat surface 326d extends to the lower end of the claw-like member 326. With respect to the overall length of the reversely-slanting surface 326d, it is extended from the body of the claw-like member 326 by an amount equal to about 35% of the thickness of this body which corresponds to the thickness of the projected distal end portion 326c. If the angle of inclination of the reversely-slanting surface 326d with respect to the plane (horizontal plane) perpendicular to the spindle shaft 24 is set to the range of between 100° and 128°, a good disk loading effect is achieved, and the optimum inclination angle is 114°.

With this configuration of the claw-like member 326 having the reversely-slanting surface 326d, the reversely-slanting surfaces 326d of the claw-like members 326 cooperate with the slanting portions 328a of the cone ring 328 to positively hold the inner peripheral edge portion of the disk 23 to thereby effect the automatic alignment thereof. Also, thanks to the reversely-slanting surfaces 326d, each formed over the entire thickness of the claw-like member 326, and the slanting surfaces of the projected portions 328b of the cone ring 328, even if there are variations in the inner diameter of the disk and the thickness of the inner peripheral edge portion of the disk, these variations can be absorbed.

Therefore, the disk 23 is aligned, and is held on the turntable 321. With this construction of the disk holding mechanism portion 330, the overall thickness of this mechanism portion 330 can be reduced, and also a force, required for removing or unloading the optical disk 23, can be reduced.

Center hub windows 325a are formed respectively in three portions of the center hub 325 spaced circumferentially 120 degrees from one another. Guide grooves 325b are formed at a reverse side of the center hub window 325a, and an engagement projection 325c is provided at a radially-inner end of the center hub window 325a. A bottom projected portion 325d, projecting in a terrace-like manner, is provided at the bottom of the radially-outer end portion of the center hub window 325a. The bosses 326a of each claw-like member 326 are engaged respectively in the guide grooves 325b of the associated center hub window 325a. The claw-like member 326 is supported on the center hub 325, with the bosses 326a engaged respectively in the guide grooves 325b, in such a manner that the claw-like member 326 is slidable in the radial direction of the disk, and also is angularly movable about the radially-outermost portions of the guide grooves 125b (and the radially-innermost portion of the bottom projected portion 325d) in a direction perpendicular to the disk surface. When the bosses 326a slide respectively along the guide grooves 325b, the bottom projected portion 325d serves as a guide, and when loading the disk 23, the bottom projection portions 325d function to support the pressing force applied to the claw-like members 326 from the upper side. When unloading or removing the disk 23, the bottom projected portion 325d serves as a pivot point about which the bosses 326a are angularly moved. When the bottom projected portion 325d is provided at the radially-outer end portion of the center hub window 325a as described above, it achieves the intended functions, but the position of provision of the bottom projected portion 325d is not limited to the radially-outer end portion of the center hub window 325a, and it may be formed on the center hub 325 over the entire circumference thereof. In this case, the configuration of the center hub 325 is simpler, and the molding of the center hub 325 can be effected more easily.

A resilient member 327 extends between each engagement projection 325c of the center hub 325 and the engagement projection 326e of the associated claw-like member 326, and is received in the center hub 325. The resilient member 327 comprises, for example, a compression spring. Spaces 335 for allowing the bending of the resilient members 327 are formed respectively in those portions of the turntable 321 disposed respectively beneath the three resilient members 327. Therefore, each claw-like member 326 is urged toward the outer periphery of the disk by the resilient member 327, so that the bosses 326a are engaged respectively in the radially-outermost portions of the guide grooves 325b (and the radially-innermost portions of the bottom projected portions 325d in a stand-by condition).

As shown in FIG. 7, the turntable unit 336 of the above construction can be formed into a total thickness of not more than 3.8 mm (for example, 3.5 mm), and more specifically the dimension of its disk-unloading side portion, measured from the disk-mounting surface (that is, the upper surface of the slip sheet 322), is not more than 2.5 mm (for example, 2.25 mm), and the dimension of its disk-loading side portion (close to the turntable 321), measured from the disk-mounting surface, is not more than 1.3 mm (for example, 1.25 mm).

Figure 24A:
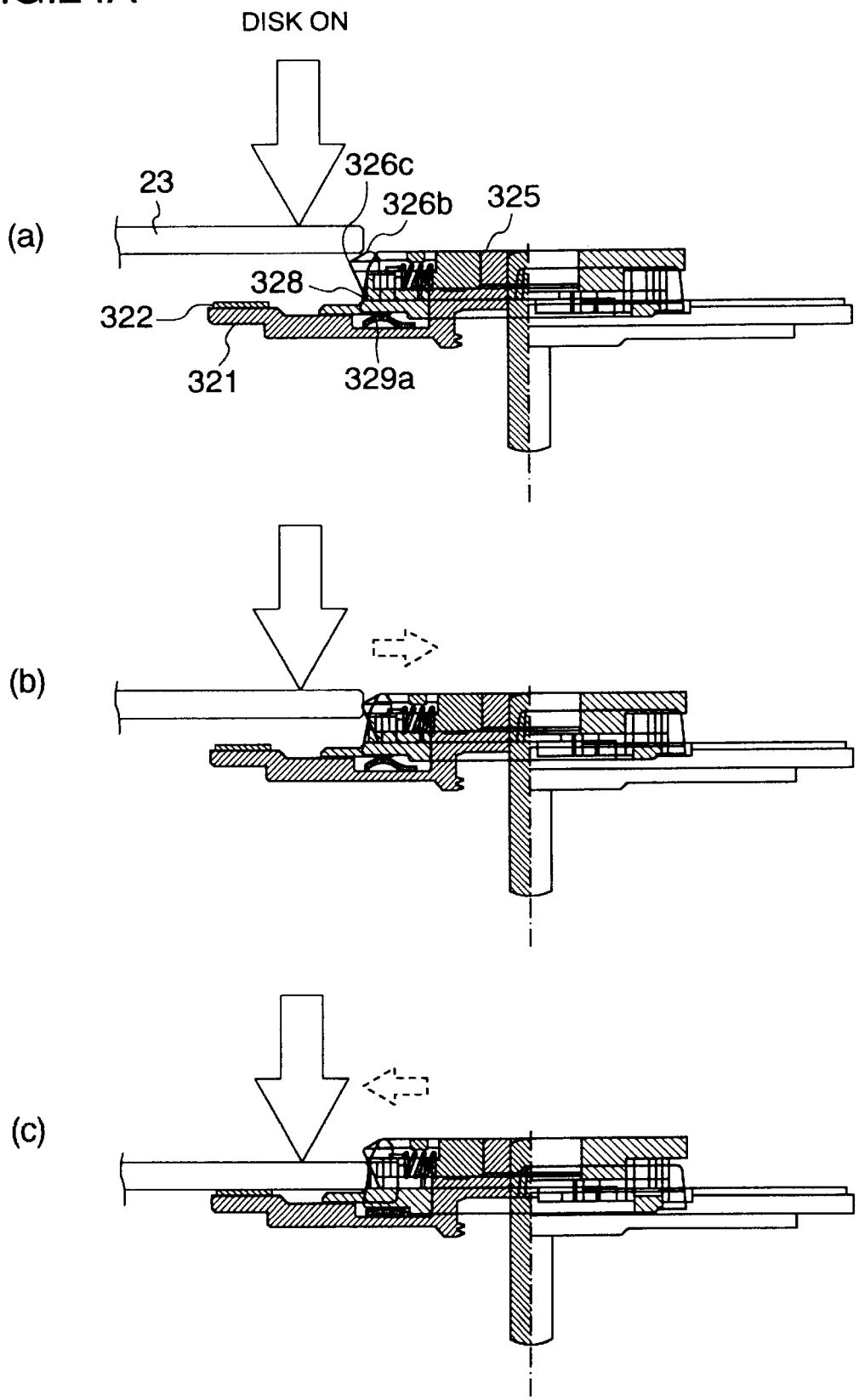
FIG. 24A is a view showing the disk loading operation.
Figure 26A:
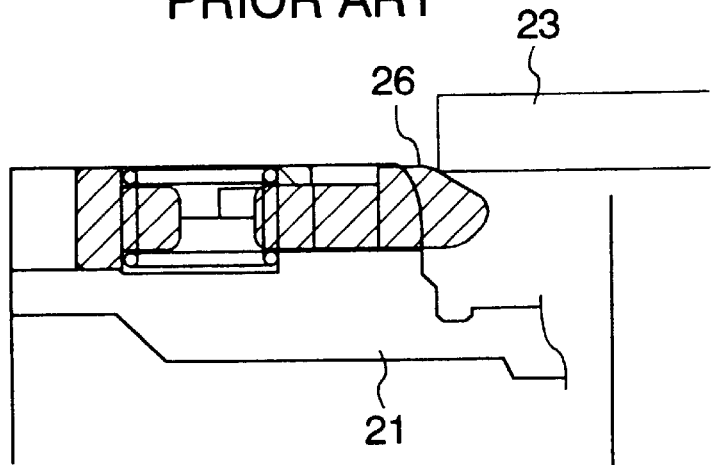
FIG. 26A is a view showing a disk loading operation of the disk holding device of FIG. 25.
Figure 26B:
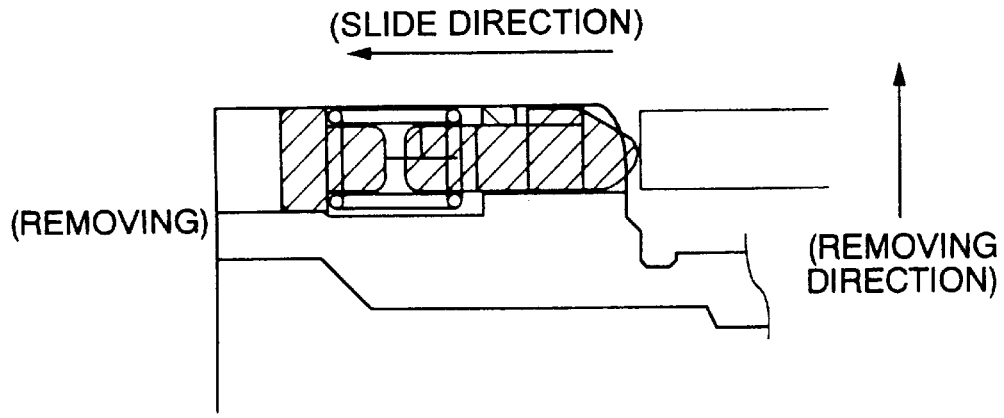
FIG. 26B is a view showing a disk unloading operation of the disk holding device of FIG. 25.
Figure 27:
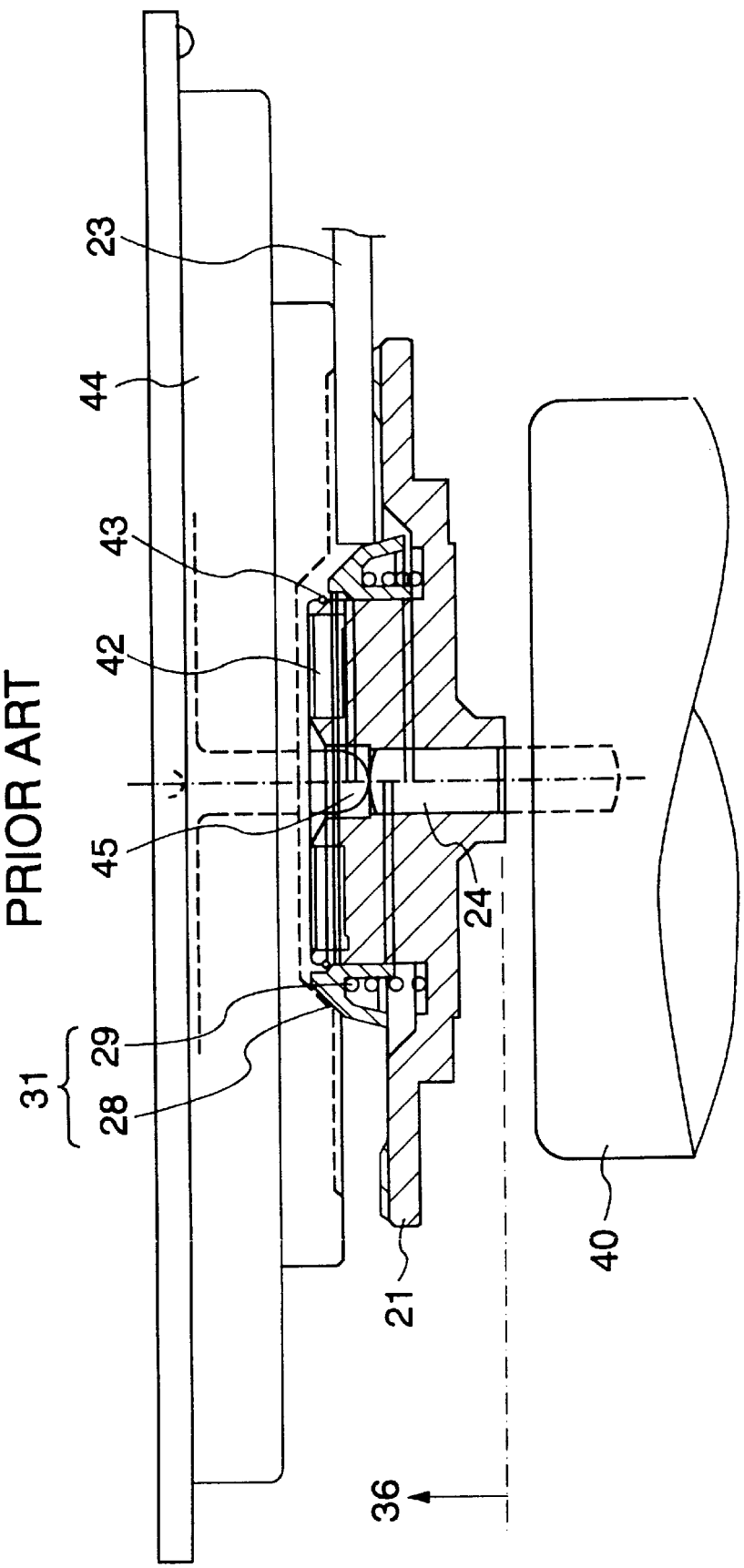
FIG. 27 is a view showing the construction of a conventional disk holding device of the clamp type.

The disk loading and unloading operations of the turntable unit 336 of the above construction will now be described. FIGS. 24A and 24B are views showing the disk loading and unloading operations by the disk holding device of FIG. 20. The correlation between the disk holding mechanism portion 330 and the disk alignment mechanism portion 331 of the invention, as well as the operation of the claw-like members 326 during the loading and unloading of the disk 23, will be described in detail with reference to FIGS. 20 to 24B.

First, the disk loading operation will be described. The operator presses the disk 23 against the disk holding mechanism portion 330 (FIG. 24A(a)). As a result, the disk 23 is pressed against the slanting portions 326b of the three claw-like members 326 from the upper side, and is loaded onto the turntable 321. At this time, each of the claw-like members 326 is pushed by the disk 23, while supported by the bottom projected portion 325d, to be retracted against the bias of the resilient member 327 to slide toward the inner periphery of the disk 23 along the guide grooves 325b (FIG. 24A(b)).

When the disk 23 is further pushed, the inner peripheral edge of the disk 23 moves past the projected distal end portions 326c of the claw-like members 326. During this operation, a lower edge of the inner peripheral edge of the disk 23 abuts against the slanting portions 328a of the cone ring 328. When the disk 23 is further pushed, the cone ring 328 is moved downward against the bias of the wave washer 329a, and at the same time the position of the center of the disk 23 is regulated by the slanting portions 328a (that is, the automatic alignment of the disk 23 is effected).

At this time, since the number of the waves of the wave washer 329a is set to a multiple of the number of the claw-like members 326, the load points of the cone ring 328 are urged uniformly over the entire periphery thereof. Also, since the deformation of the waves is effected between the recessed portion of the turntable 321 and the lower side of the cone ring 328, the region of sliding movement of the cone ring 328 in the axial direction (that is, the retraction stroke) is not affected at all.

The disk 23 is further pushed until it is brought into intimate contact with the slip sheet 322 bonded to the turntable 321. During this operation, the projected distal end portion 326c pass past the disk 23 in the direction of the thickness of this disk, so that each claw-like member 326 is projected to slide along the guide grooves 325b toward the outer periphery of the disk 23 under the influence of the resilient member 327.

At this time, if the disk 23 has a standard thickness or a smaller thickness, the reversely-slanting surfaces 326d of the claw-like members 326 and the slanting portions 328a of the cone ring 328 abut against the upper and lower edges of the inner peripheral edge of the disk 23, thereby holding the disk 23 on the turntable 321 and also effecting the automatic alignment. Particularly in this third embodiment, the reversely-slanting surface 326d of each claw-like member 326 and each slanting portion 328a of the cone ring 328 both have the respective long extension portions, and therefore abut against the upper and lower edges of the inner peripheral edge of the disk 23, so that the claw-like members 326 will not slide onto the upper surface of the disk 23 (FIG. 24A(c)). Thus, merely by pressing the disk 23 against the disk holding mechanism portion 330 by the operator and then by pushing the disk 23, the automatic alignment and the self-holding can be completed.

Next, the unloading or removal of the disk 23 will be described. The operator lifts the disk 23 in the unloading direction (FIG. 24B(d)). As a result, the reversely-slanting surface 326d of each claw-like member 326 is subjected to an upwardly-lifting force. The bosses 326a of each claw-like member 326 are angularly moved about an axis on the bottom projected portion 325d in a direction perpendicular to the disk surface (see an arrow in FIG. 24B(e)). At this time, the engagement projection 326e of each claw-like member 326 is angularly moved toward the turntable 321, and also the resilient member 327 is flexed or bent, and this angular movement and this flexing are both effected in the space 335. At the same time, the reversely-slanting surface 326d is pushed by the disk 23, and is retracted to slide along the guide grooves 325b toward the inner periphery of the disk against the bias of the resilient member 327. Therefore, the angular movement of the reversely-slanting surface 326d of the claw-like member 326 is not limited at all, and the disk 23 can be easily detached and removed from the turntable unit 336. After the disk 23 is removed, each claw-like member 326 is returned to its stand-by position (FIG. 24B(f)).

As described above in detail, when the force is applied to push back the claw-like member 326, the claw-like member 326 is retracted to slide in the radial direction of the disk, and when the force to remove the disk 23 is applied, the claw-like member 326 is angularly moved in the disk-unloading direction about the bottom protected portion 325d. The resilient member 327 can be flexed or bent downwardly. Namely, each claw-like member 326 is received in the center hub 325, and is slidable in the radial direction of the disk, and is angularly movable in the disk-unloading direction. With this construction, the disk holding mechanism portion 330 can be formed into a thin design, and also the operator can effect the automatic alignment and self-holding of the disk with the simple operation. And besides, since the disk 23 can be easily removed with a small force, an undue force will not be applied to the disk.

Next, the balance between the force of the aligning function and the force of the self-holding function in the above operation will be described in further detail. As shown in FIG. 20, the disk 23 is mounted on the slip sheet 322, bonded to the turntable 321, while maintaining a certain static friction coefficient. As a result, a slip force, withstanding an angular acceleration developing when the disk 23 is rotated, is produced. If this slip force is too large or too small, the disk holding device can not properly function. This slip force is produced by the holding force with which the three claw-like members 326 are pressed against the upper edge portion of the center hole in the disk 23. The larger the holding force becomes, the larger the slip force becomes.

This holding force is also influenced by the pushing force applied uniformly to the lower edge portion of the center hole in the disk 23 by the cone ring 328. With the increase of the holding force, the force of the urging means (for example, the spring force of the wave washer 329a), urging the cone ring 328 in the disk-unloading direction, must be increased; otherwise, the disk can not be aligned in a well-balanced manner.

Therefore, with respect to the relationship of these three forces, the spring force of the compressed resilient members 327, required to self-hold the disk by the three claw-like members 326, is set to 200 gf±50 gf. Then, in order to press the cone ring 328 uniformly against the disk, the spring force of the wave washer 329a is set to 100 gf±50 gf, and further the slip force of the disk is set to 200 gf±50 gf. By doing so, these forces, acting on the disk, can be well balanced.

In this third embodiment, the urging means, urging the cone ring 328, comprises the wave washer 329a. However, in this embodiment, the same effects can be achieved even if a return coil spring or magnets are used as in the second embodiment. Therefore, explanation of such modification, using the return coil spring or the magnets, will be omitted.

What is claimed is:

1. A disk holding device for holding a disk by being passed through a center hole portion of the disk, said device comprising:

a plurality of claw-like holding means for engaging with the center hole portion of the disk to hold the disk;

first urging means for urging said claw-like holding means in a radial direction of the disk;

center support means for receiving (i) said claw-like holding means such that said claw-like holding means are slidable in the radial direction of the disk and (ii) said first urging means;

disk alignment means having an alignment slanting portion for engaging with the center hole portion of the disk to align the center of the disk, said disk alignment means being slidable relative to said center support means in a disk-loading and a disk-unloading direction;

second urging means for urging said disk alignment means in the disk-unloading direction; and rotary disk means for supporting the disk thereon, wherein:

said disk alignment means and said center support means are arranged coaxially with respect to a rotation shaft of said rotary disk means.

2. A device according to claim 1, wherein when loading the disk, said claw-like holding means are retracted by the disk toward an inner periphery of said center support portion so as to facilitate the loading of the disk, and the center hole portion of the disk is brought into engagement with said alignment slanting portion of said disk alignment means so as to align the center of the disk therewith, and said claw-like holding means are pressed by said first urging means against said second urging means, thereby allowing the disk to be aligned and held by said disk alignment means and said claw-like holding means; and when unloading said disk, said claw-like holding means are angularly moved in the disk-unloading direction by a disk-lifting force so as to facilitate the unloading of the disk.

3. A device according to claim 1, wherein when loading the disk, said claw-like holding means are retracted by the disk toward an inner periphery of said center support means so as to facilitate the loading of the disk, and the center hole portion of the disk is brought into engagement with said alignment slanting portion of said disk alignment means so as to align the center of the disk therewith, and lower portions of said claw-like holding means are brought into engagement with an upper side of the center hole portion of the disk by said first urging means against said second urging means, thereby allowing the disk to be aligned and held by said disk alignment means and said claw-like holding means; and when unloading said disk, said claw-like holding means are angularly moved in the disk-unloading direction by a disk-lifting force so as to facilitate the unloading of the disk.

4. A device according to claim 1, wherein when loading the disk, said claw-like holding means are retracted by the disk toward an inner periphery of said center support means so as to facilitate the loading of the disk, and the center hole portion of the disk is brought into engagement with said alignment slanting portion of said disk alignment means so as to align the center of the disk, and said claw-like holding means are pressed by said first urging means against said second urging means, thereby allowing the disk to be aligned and held by holding the center hole portion of the disk between said claw-like holding means and said alignment slanting portion of said disk alignment means; and when unloading said disk, said claw-like holding means are angularly moved in the disk-unloading direction by a disk-lifting force so as to facilitate the unloading of the disk.

5. A device according to claim 1, wherein said disk is supported by said rotary disk means in accordance with a balance between an urging force applied by said claw-like holding means to said center hole portion and another urging force applied by said disk alignment means to said center hole portion.

6. A disk holding device for holding a disk by being passed through a center hole portion of the disk, comprising:
   a plurality of claw-like holding means for engaging with the center hole portion of the disk to hold the disk;
   first urging means for urging said claw-like holding means in a radial direction of the disk;
   center support means for receiving said claw-like holding means in such a manner that said claw-like holding means are slidable in the radial direction of the disk, said center support means receiving said first urging means;
   disk alignment means having an alignment slanting portion for engaging with the center hole portion of the disk to align the center of the disk, said disk alignment means being slidable in a disk-loading and a disk-unloading direction;
   second urging means urging said disk alignment means in the disk-unloading direction; and
   rotary disk means for supporting the disk thereon;
   wherein said disk alignment means and said center support means are arranged coaxially with a rotation shaft of said rotary disk means;
   wherein when loading the disk, said claw-like holding means are retracted by the disk toward an inner periphery of said center support portion so as to facilitate the loading of the disk, and the center hole portion of the disk is brought into engagement with said alignment slanting portion of said disk alignment means so as to align the center of the disk therewith, and said claw-like holding means are pressed by said first urging means against said second urging means, thereby allowing the disk to be aligned and held by said disk alignment means and said claw-like holding means; and
   wherein when unloading said disk, said claw-like holding means are angularly moved in the disk-unloading direction by a disk-lifting force so as to facilitate the unloading of the disk.

7. A device according to claim 6, wherein said claw-like holding means includes a slanting surface decreasing a thickness thereof progressively toward its distal end, and a ball end portion of a spherical shape which is continuous with said slanting surface and formed at the distal end and lower side of said claw-like holding means.

8. A disk holding device for holding the disk by being passed through a center hole portion of the disk, comprising:
   a plurality of claw-like holding means for engaging with the center hole portion of the disk to hold the disk;
   first urging means for urging said claw-like holding means in a radial direction of the disk;
   center support means for receiving said claw-like holding means in such a manner that said claw-like holding means are slidable in the radial direction of the disk, said center support means receiving said first urging means;
   disk alignment means having an alignment slanting portion for engaging with the center hole portion of the disk to align the center of the disk, said disk alignment means being slidable in a disk-loading and a disk-unloading direction;
   second urging means for urging said disk alignment means in the disk-unloading direction; and
   rotary disk means for supporting the disk thereon;
   wherein said disk alignment means and said center support means are arranged coaxially with a rotation shaft of said rotary disk means;
   wherein when loading the disk, said claw-like holding means are retracted by the disk toward an inner periphery of said center support means so as to facilitate the loading of the disk, and the center hole portion of the disk is brought into engagement with said alignment slanting portion of said disk alignment means so as to align the center of the disk therewith, and lower portions of said claw-like holding means are brought into engagement with an upper side of the center hole portion of the disk by said first urging means against said second urging means, thereby allowing the disk to be aligned and held by said disk alignment means and said claw-like holding means; and
   wherein when unloading said disk, said claw-like holding means are angularly moved in the disk-unloading direction by a disk-lifting force so as to facilitate the unloading of the disk.

9. A device according to claim 8, wherein said claw-like holding means includes a slanting surface engaging with the disk when loading the disk, a projected distal end portion for engagement with the disk when the center hole portion of the disk passes past said claw-like holding means, and a lower projected portion engaging with the center hole portion of the disk to hold the disk, and an angle of inclination of said slanting surface with respect to a plane perpendicular to said rotation shaft is in the range of between 130° and 150°.

10. A device according to claim 8, wherein an angle of inclination of said slanting alignment portion of said disk alignment means with respect to a plane perpendicular to said rotation shaft is in the range of between 68.7° and 88.7°.

11. A disk holding device for holding a disk by being passed through a center hole portion of the disk, said device comprising:
   a plurality of claw-like holding means for engaging with the center hole portion of the disk to hold the disk;
   first urging means for urging said claw-like holding means in a radial direction of the disk;
   center support means for receiving said claw-like holding means such that said claw-like holding means are slidable in the radial direction of the disk, said center support means receiving said first urging means;
   disk alignment means having an alignment slanting portion for engaging with the center hole portion of the disk to align the center of the disk, said disk alignment means being slidable relative to said center support means in a disk-loading and a disk-unloading direction;
   second urging means for urging said disk alignment means in the disk-unloading direction; and
   rotary disk means for supporting the disk thereon, wherein:
      said disk alignment means and said center support means are arranged coaxially with a rotation shaft of said rotary disk means;
      when loading the disk, said claw-like holding means are retracted by the disk toward an inner periphery of said center support means so as to facilitate the loading of the disk, and the center hole portion of the disk is brought into engagement with said alignment slanting portion of said disk alignment means so as to align the center of the disk, and said claw-like holding means are pressed by said first urging means in a direction opposing a force of said second urging means, thereby allowing the disk to be aligned and held by holding the center hole portion of the disk between said claw-like holding means and said disk alignment means, and when unloading said disk, said claw-like holding means are angularly moved in the disk-unloading direction by a disk-lifting force so as to facilitate the unloading of the disk.

12. A device according to claim 11, wherein an angle of inclination of said slanting alignment portion of said disk alignment means with respect to a plane perpendicular to said rotation shaft is in the range of between 68.7° and 88.7°.

13. A device according to claim 11, wherein said disk is supported by said rotary disk means in accordance with a balance between an urging force applied by said claw-like holding means to said center hole portion and another urging force applied by said disk alignment means to said center hole portion.

14. A disk holding device for holding a disk by being passed through a center hole portion of the disk, said device comprising:

a plurality of claw-like holding means for engaging with the center hole portion of the disk to hold the disk;

first urging means for urging said claw-like holding means in a radial direction of the disk;

center support means for receiving said claw-like holding means such that said claw-like holding means are slidable in the radial direction of the disk, said center support means receiving said first urging means;

disk alignment means having an alignment slanting portion for engaging with the center hole portion of the disk to align the center of the disk, said disk alignment means being slidable relative to said center support means in a disk-loading and a disk-unloading direction;

second urging means for urging said disk alignment means in the disk-unloading direction; and rotary disk means for supporting the disk thereon, wherein:

said disk alignment means and said center support means are arranged coaxially with a rotation shaft of said rotary disk means;

when loading the disk, said claw-like holding means are retracted by the disk toward an inner periphery of said center support means so as to facilitate the loading of the disk, and the center hole portion of the disk is brought into engagement with said alignment slanting portion of said disk alignment means so as to align the center of the disk, and said claw-like holding means are pressed by said first urging means in a direction opposing a force of said second urging means, thereby allowing the disk to be aligned and held by holding the center hole portion of the disk between said claw-like holding means and said disk alignment means;

when unloading said disk, said claw-like holding means are angularly moved in the disk-unloading direction by a disk-lifting force so as to facilitate the unloading of the disk, and wherein said claw-like holding means includes a slanting surface engaging with the disk when loading the disk, a projected distal end portion engaging with the disk when the center hole portion of the disk moves past said claw-like holding means, and a reversely-slanting surface engaging with the center hole portion of the disk to hold the disk, and an angle of inclination of said slanting surface with respect to a plane perpendicular to said rotation shaft is in the range of between 140° and 160°, and an angle of inclination of said reversely-slanting surface with respect to the plane perpendicular to said rotation shaft is in the range of between 100° and 128°.

15. A disk holding device for holding a disk by being passed through a center hole portion of the disk, comprising:

a plurality of claw-like holding means for engaging with the center hole portion of the disk to hold the disk, said claw-like holding means including a slanting surface decreasing a thickness thereof progressively toward its distal end, and a ball end portion of a spherical shape which is continuous with said slanting surface and formed at the distal end and lower side of said claw-like holding means;

first urging means for urging said claw-like holding means in a radial direction of the disk;

center support means for receiving said claw-like holding means in such a manner that said claw-like holding means are slidable in the radial direction of the disk, said center support means receiving said first urging means;

disk alignment means having an alignment slanting portion for engaging with the center hole portion of the disk to align the center of the disk, said disk alignment means being slidable in a disk-loading and a disk-unloading direction;

second urging means urging said disk alignment means in the disk-unloading direction; and rotary disk means for supporting the disk thereon;

wherein said disk alignment means and said center support means are arranged coaxially with a rotation shaft of said rotary disk means;

wherein when loading the disk, said claw-like holding means are retracted by the disk toward an inner periphery of said center support portion so as to facilitate the loading of the disk, and the center hole portion of the disk is brought into engagement with said alignment slanting portion of said disk alignment means so as to align the center of the disk therewith, and said claw-like holding means are pressed by said first urging means against said second urging means, thereby allowing the disk to be aligned and held by said disk alignment means and said claw-like holding means; and wherein when unloading said disk, said claw-like holding means are angularly moved in the disk-unloading direction by a disk-lifting force so as to facilitate the unloading of the disk.

16. A device according to claim 15, wherein said first urging means comprises a compression spring which extends between said center support means and said claw-like holding means, and is received in said center support means.

17. A device according to claim 15, wherein said first urging means comprises an annular elastic member of a substantially circular cross-section provided in an inner peripheral portion of said center support means.

18. A device according to claim 15, wherein said second urging means comprises a conical coil spring wound into a generally conical shape, and said conical coil spring is held against said rotary disk means to urge said disk alignment means.

19. A device according to claim 15, wherein when the disk is loaded, a dimension of a disk-unloading side portion of said rotary disk means, measured from a disk-mounting surface, is not more than 2.5 mm.

20. A device according to claim 15, wherein when the disk is loaded, a total thickness of said rotary disk means is not more than 3.8 mm, and a dimension of a disk-unloading side portion of said rotary disk means, measured from a disk-mounting surface, is not more than 2.5 mm, and a dimension of a disk-loading side portion of said rotary disk means, measured from the disk-mounting surface, is not more than 1.3 mm.

21. A disk holding device for holding a disk by being passed through a center hole portion of the disk, comprising:

a plurality of claw-like holding means for engaging with the center hole portion of the disk to hold the disk;

first urging means for urging said claw-like holding means in a radial direction of the disk;

center support means for receiving said claw-like holding means in such a manner that said claw-like holding means are slidable in the radial direction of the disk, said center support means receiving said first urging means;

disk alignment means including an alignment slanting portion for engaging with the center hole portion of the disk to align the center of the disk, and a plurality of projected portions disposed in an extension of said alignment slanting portion, said disk alignment means being slidable in a disk-loading and a disk-unloading direction;

second urging means for urging said disk alignment means in the disk-unloading direction; and rotary disk means for supporting the disk thereon, said rotary disk means having slip prevention means for preventing a slip of the disk when the disk is supported on said rotary disk means;

wherein said claw-like holding means includes a slanting surface engaging with the disk when loading the disk, a projected distal end portion engaging with the disk when the center hole portion of the disk passes past said claw-like holding means, and a lower projected portion engaging with the center hole portion of the disk to hold the disk, and an angle of inclination of said slanting surface with respect to a plane perpendicular to a rotation shaft of said rotary disk means is in the range of between 130° and 150°;

wherein an angle of inclination of said slanting alignment portion of said disk alignment means with respect to the plane perpendicular to said rotation shaft is in the range of between 68.7° and 88.7°;

wherein said disk alignment means and said center support means are arranged coaxially with said rotation shaft of said rotary disk means;

wherein when loading the disk, said claw-like holding means are retracted by the disk toward an inner periphery of said center support means so as to facilitate the loading of the disk, and the center hole portion of the disk is brought into engagement with said alignment slanting portion of said disk alignment means so as to align the center of the disk therewith, and lower portions of said claw-like holding means are brought into engagement with an upper side of the center hole portion of the disk by said first urging means against said second urging means, thereby allowing the disk to be aligned and held by said disk alignment means and said claw-like holding means; and wherein when unloading said disk, said claw-like holding means are angularly moved in the disk-unloading direction by a disk-lifting force so as to facilitate the unloading of the disk.

22. A device according to claim 21, wherein an amount of projecting of said lower projected portion of said claw-like holding means is about 10% of an overall thickness of said claw-like holding means.

23. A device according to claim 21, wherein an amount of projecting of each of said projected portions of said disk alignment means is about 20% of an overall thickness of said disk alignment means.

24. A device according to claim 21, wherein said first urging means comprises a compression spring which extends between said center support means and said claw-like holding means, and is received in said center support means.

25. A device according to claim 21, wherein said second urging means comprises a conical coil spring wound into a generally conical shape, and said conical coil spring is held against said rotary disk means to urge said disk alignment means.

26. A device according to claim 21, wherein said second urging means comprises a wave washer formed into a wavy configuration, and said wave washer is held against said rotary disk means to urge said disk alignment means.

27. A device according to claim 21, in which said second urging means comprises magnetic members which are mounted respectively on said rotary disk means and said disk alignment means in opposed relation to each other, and are so magnetized that their opposed surfaces have the same magnetic pole.

28. A device according to claim 21, wherein in order to align the disk and also to properly maintain a held condition of the disk, a spring force of said first urging means is set to 200 gf±50 gf, and a spring force of said second urging means is set to 100 gf±50 gf, and a slip force of said slip prevention means is set to 200 gf±50 gf.

29. A device according to claim 21, wherein when the disk is loaded, a dimension of a disk-unloading side portion of said rotary disk means, measured from a disk-mounting surface, is not more than 2.5 mm.

30. A device according to claim 21, wherein when the disk is loaded, a total thickness of said rotary disk means is not more than 4.0 mm, and a dimension of a disk-unloading side portion of said rotary disk means, measured from a disk-mounting surface, is not more than 2.7 mm, and a dimension of a disk-loading side portion of said rotary disk means, measured from the disk-mounting surface, is not more than 1.3 mm.

31. A disk holding device for holding a disk by being passed through a center hole portion of the disk, comprising:

a plurality of claw-like holding means for engaging with the center hole portion of the disk to hold the disk;

first urging means for urging said claw-like holding means in a radial direction of the disk;

center support means for receiving said claw-like holding means in such a manner that said claw-like holding means are slidable in the radial direction of the disk, said center support means receiving said first urging means;

disk alignment means including an alignment slanting portion for engaging with the center hole portion of the disk to align the center of the disk, and a plurality of projected portions disposed in an extension of said alignment slanting portion, said disk alignment means being slidable in a disk-loading and a disk-unloading direction;

second urging means for urging said disk alignment means in the disk-unloading direction; and rotary disk means for supporting the disk thereon, said rotary disk means having slip prevention means for preventing a slip of the disk when the disk is supported on said rotary disk means;

wherein said claw-like holding means includes a slanting surface engaging with the disk when loading the disk, a projected distal end portion engaging with the disk when the center hole portion of the disk passes past said claw-like holding means, and a reversely-slanting surface engaging with the center hole portion of the disk to hold the disk, and an angle of inclination of said slanting surface with respect to a plane perpendicular to a rotation shaft of said rotary disk means is in the range of between 140° and 160°, and an angle of inclination of said reversely-slanting surface with respect to the plane perpendicular to said rotation shaft is in the range of 100° and 128°;

wherein an angle of inclination of said slanting alignment portion of said disk alignment means with respect to the plane perpendicular to said rotation shaft is in the range of between 68.7° and 88.7°;

wherein said disk alignment means and said center support means are arranged coaxially with said rotation shaft of said rotary disk means;

wherein when loading the disk, said claw-like holding means are retracted by the disk toward an inner periphery of said center support means so as to facilitate the loading of the disk, and the center hole portion of the disk is brought into engagement with said alignment slanting portion of said disk alignment means so as to align the center of the disk, and said claw-like holding means are pressed by said first urging means against said second urging means, thereby allowing the disk to be aligned and held by holding the center hole portion of the disk between said claw-like holding means and said alignment slanting portion of said disk alignment means; and wherein when unloading said disk, said claw-like holding means are angularly moved in the disk-unloading direction by a disk-lifting force so as to facilitate the unloading of the disk.

32. A device according to claim 31, wherein said center support means has a bottom projected portion provided at that portion thereof which slidably receives said claw-like holding means, and said bottom projected portion supports a pressing force applied to said claw-like holding means from the disk.

33. A device according to claim 31, wherein an overall length of said reversely-slanting surface is provided by extending from a body of said claw-like holding means by an amount equal to about 35% of a thickness of said body.

34. A device according to claim 31, wherein an overall length of said alignment slanting portion of said disk alignment means is one to two times larger than a thickness of the disk.

35. A device according to claim 31, wherein said first urging means comprises a compression spring which extends between said center support means and said claw-like holding means, and is received in said center support means.

36. A device according to claim 31, wherein said second urging means comprises a conical coil spring wound into a generally conical shape, and said conical coil spring is held against said rotary disk means to urge said disk alignment means.

37. A device according to claim 31, wherein said second urging means comprises a wave washer formed into a wavy configuration, and said wave washer is held against said rotary disk means to urge said disk alignment means.

38. A device according to claim 31, in which said second urging means comprises magnetic members which are mounted respectively on said rotary disk means and said disk alignment means in opposed relation to each other, and are so magnetized that their opposed surfaces have the same magnetic pole.

39. A device according to claim 31, wherein in order to align the disk and also to properly maintain a held condition of the disk, a spring force of said first urging means is set to 200 gf±50 gf, and a spring force of said second urging means is set to 100 gf±50 gf, and a slip force of said slip prevention means is set to 200 gf±50 gf.

40. A device according to claim 31, wherein when the disk is loaded, a dimension of a disk-unloading side portion of said rotary disk means, measured from a disk-mounting surface, is not more than 2.5 mm.

41. A device according to claim 31, wherein when the disk is loaded, a total thickness of said rotary disk means is not more than 3.8 mm, and a dimension of a disk-unloading side portion of said rotary disk means, measured from a disk-mounting surface, is not more than 2.5 mm, and a dimension of a disk-loading side portion of said rotary disk means, measured from the disk-mounting surface, is not more than 1.3 mm.

* * * * *